US012632053B2

(12) United States Patent
Mercer et al.

(10) Patent No.: US 12,632,053 B2
(45) Date of Patent: May 19, 2026

(54) SYSTEMS AND METHODS FOR OPERATING A MOBILE ROBOT

(71) Applicant: Clearpath Robotics Inc., Kitchener (CA)

(72) Inventors: Jason Mercer, Kitchener (CA); Ivor Wanders, Kitchener (CA); Ryan Christopher Gariepy, Kitchener (CA); Peiyi Chen, Kitchener (CA); Krispin Alexander Davies, Waterloo (CA); Farwa Khan, Kitchener (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 185 days.

(21) Appl. No.: 18/462,060

(22) Filed: Sep. 6, 2023

(65) Prior Publication Data

US 2024/0094737 A1 Mar. 21, 2024

Related U.S. Application Data

(60) Provisional application No. 63/407,889, filed on Sep. 19, 2022.

(51) Int. Cl.
*G05D 1/00* (2024.01)
(52) U.S. Cl.
CPC ......... *G05D 1/0223* (2013.01); *G05D 1/0214* (2013.01); *G05D 1/0225* (2013.01)
(58) Field of Classification Search
CPC .. G05D 1/0223; G05D 1/0214; G05D 1/0225; G05D 2105/28; G05D 1/622; G05D 2107/70; G05D 1/2427; G05D 2109/10
See application file for complete search history.

(56) References Cited

U.S. PATENT DOCUMENTS

| | | | |
|---|---|---|---|
| 5,581,250 | A | 12/1996 | Khvilivitzky |
| 5,700,074 | A | 12/1997 | Sugimoto et al. |

(Continued)

FOREIGN PATENT DOCUMENTS

| | | |
|---|---|---|
| WO | 2015008380 A1 | 1/2015 |

OTHER PUBLICATIONS

Xiao et al., Pallet recognition and localization using an RGB-D camera, Sep. 13, 2017, International Journal of Advanced Robotic Systems, (Year: 2017).

*Primary Examiner* — Anne Marie Antonucci
*Assistant Examiner* — Luis G Del Valle

(57) ABSTRACT

Systems and methods for operating a mobile robot is disclosed. The system can include a processor and a plurality of sensors mounted on the mobile robot. The method includes operating the mobile robot to autonomously navigate along a trajectory. While the mobile robot autonomously navigates along the trajectory, the method involves operating the processor to: monitor an angular velocity and a linear velocity of the mobile robot; determine one or more critical sensor regions defined with reference to the mobile robot based at least on the angular velocity and the linear velocity of the mobile robot; and adapt the operation of the plurality of sensors to prioritize capture of sensor data within the one or more critical sensor regions. Each sensor can be operable to capture the sensor data for an adjustable detection region defined with respect to the sensor and the mobile robot.

30 Claims, 14 Drawing Sheets

(56)        References Cited

U.S. PATENT DOCUMENTS

| | | |
|---|---|---|
| 5,785,281 A | 7/1998 | Peter et al. |
| 5,806,938 A | 9/1998 | Stumpe et al. |
| 5,983,161 A | 11/1999 | Lemelson et al. |
| 6,405,132 B1 | 6/2002 | Breed et al. |
| 9,102,406 B2 | 8/2015 | Stark et al. |
| 9,141,109 B1 | 9/2015 | Kamata |
| 9,187,088 B1 | 11/2015 | Ferguson et al. |
| 9,383,753 B1 | 7/2016 | Templeton et al. |
| 9,442,487 B1 | 9/2016 | Ferguson et al. |
| 9,671,791 B1 | 6/2017 | Paczan |
| 9,779,314 B1 | 10/2017 | Wendel et al. |
| 9,896,030 B2 | 2/2018 | Sugimoto |
| 10,019,008 B2 | 7/2018 | Kong |
| 10,328,942 B2 | 6/2019 | Kelly et al. |
| 10,446,034 B2 | 10/2019 | Akamine et al. |
| 10,909,629 B1 | 2/2021 | Madigan et al. |
| 11,225,275 B2 | 1/2022 | Gariepy et al. |
| 11,305,593 B2 | 4/2022 | Coombs |
| 11,649,147 B2 | 5/2023 | Lunscher |
| 2002/0013651 A1 | 1/2002 | Weiberle et al. |
| 2002/0137489 A1 | 9/2002 | Dutta |
| 2003/0096594 A1 | 5/2003 | Naboulsi |
| 2004/0204803 A1 | 10/2004 | Matsuda et al. |
| 2005/0023052 A1 | 2/2005 | Beck et al. |
| 2007/0106473 A1 | 5/2007 | Bodin et al. |
| 2008/0018472 A1 | 1/2008 | Dasilva et al. |
| 2008/0106886 A1 | 5/2008 | Sugimoto et al. |
| 2009/0210109 A1 | 8/2009 | Ravenscroft |
| 2009/0222134 A1 | 9/2009 | Franke et al. |
| 2011/0015844 A1 | 1/2011 | Perkins et al. |
| 2011/0021310 A1 | 1/2011 | Kresse et al. |
| 2011/0210529 A1 | 9/2011 | Markstaller |
| 2012/0310466 A1 | 12/2012 | Fairfield et al. |
| 2013/0142393 A1 | 6/2013 | Burger et al. |
| 2013/0144480 A1 | 6/2013 | Kobayashi et al. |
| 2013/0197760 A1 | 8/2013 | Castaneda et al. |
| 2013/0253770 A1 | 9/2013 | Nishikawa et al. |
| 2013/0311075 A1 | 11/2013 | Tran et al. |
| 2014/0114526 A1 | 4/2014 | Erb |
| 2014/0214255 A1 | 7/2014 | Dolgov et al. |
| 2014/0277888 A1 | 9/2014 | Dastoor et al. |
| 2014/0365113 A1 | 12/2014 | Mcgavran et al. |
| 2015/0019013 A1* | 1/2015 | Rose ...................... B25J 13/08 |
| | | 702/41 |
| 2015/0046034 A1 | 2/2015 | Kikuchi |
| 2015/0161872 A1 | 6/2015 | Beaulieu et al. |
| 2015/0239442 A1 | 8/2015 | Yamakado et al. |
| 2015/0251658 A1 | 9/2015 | Kato |
| 2015/0266487 A1 | 9/2015 | Kato |
| 2015/0269860 A1 | 9/2015 | Shaw et al. |
| 2015/0291210 A1 | 10/2015 | Kageyama |
| 2016/0001775 A1 | 1/2016 | Wilhelm et al. |
| 2016/0059851 A1 | 3/2016 | Klier |
| 2016/0068267 A1 | 3/2016 | Liu et al. |
| 2016/0093210 A1 | 3/2016 | Bonhomme |
| 2016/0193999 A1 | 7/2016 | Sasabuchi |
| 2016/0250930 A1 | 9/2016 | Collins et al. |
| 2016/0304198 A1 | 10/2016 | Jourdan |
| 2016/0318445 A1 | 11/2016 | Sugimoto |
| 2017/0036771 A1 | 2/2017 | Woodman et al. |
| 2017/0076616 A1 | 3/2017 | Kanade et al. |
| 2017/0102241 A1 | 4/2017 | Paduano et al. |
| 2017/0158178 A1 | 6/2017 | Kerber et al. |
| 2017/0188510 A1 | 7/2017 | Einecke et al. |
| 2017/0253241 A1 | 9/2017 | Filev |
| 2017/0355360 A1 | 12/2017 | Reed et al. |
| 2018/0012490 A1 | 1/2018 | Jodorkovsky et al. |
| 2018/0162349 A1 | 6/2018 | Chang et al. |
| 2018/0211536 A1 | 7/2018 | Akamine et al. |
| 2018/0264950 A1 | 9/2018 | Yokoyama et al. |
| 2018/0297585 A1 | 10/2018 | Lian et al. |
| 2018/0339701 A1 | 11/2018 | Kwon |
| 2019/0079537 A1 | 3/2019 | Yoshida et al. |
| 2019/0092347 A1 | 3/2019 | Kim |
| 2019/0120951 A1 | 4/2019 | Fischer |
| 2019/0202465 A1 | 7/2019 | Kato et al. |
| 2019/0294167 A1 | 9/2019 | Kutila |
| 2019/0344796 A1 | 11/2019 | Lian et al. |
| 2020/0025570 A1* | 1/2020 | Li ........................ G06T 7/246 |
| 2020/0181879 A1* | 6/2020 | Halder ................. E02F 9/2054 |
| 2020/0239242 A1 | 7/2020 | Hoofard |
| 2020/0284601 A1 | 9/2020 | Myers |
| 2021/0166568 A1* | 6/2021 | Kersulec ................. G05D 1/49 |
| 2021/0232153 A1 | 7/2021 | Inoue |
| 2021/0362758 A1* | 11/2021 | Bambrogan ............ E01F 13/12 |
| 2022/0005291 A1 | 1/2022 | Konrardy |
| 2022/0258614 A1 | 8/2022 | Matsuki et al. |
| 2023/0096516 A1* | 3/2023 | Kim ...................... G05D 1/622 |
| | | 15/319 |
| 2025/0180422 A1 | 6/2025 | Rauhala |

\* cited by examiner

500

510    502    504    506

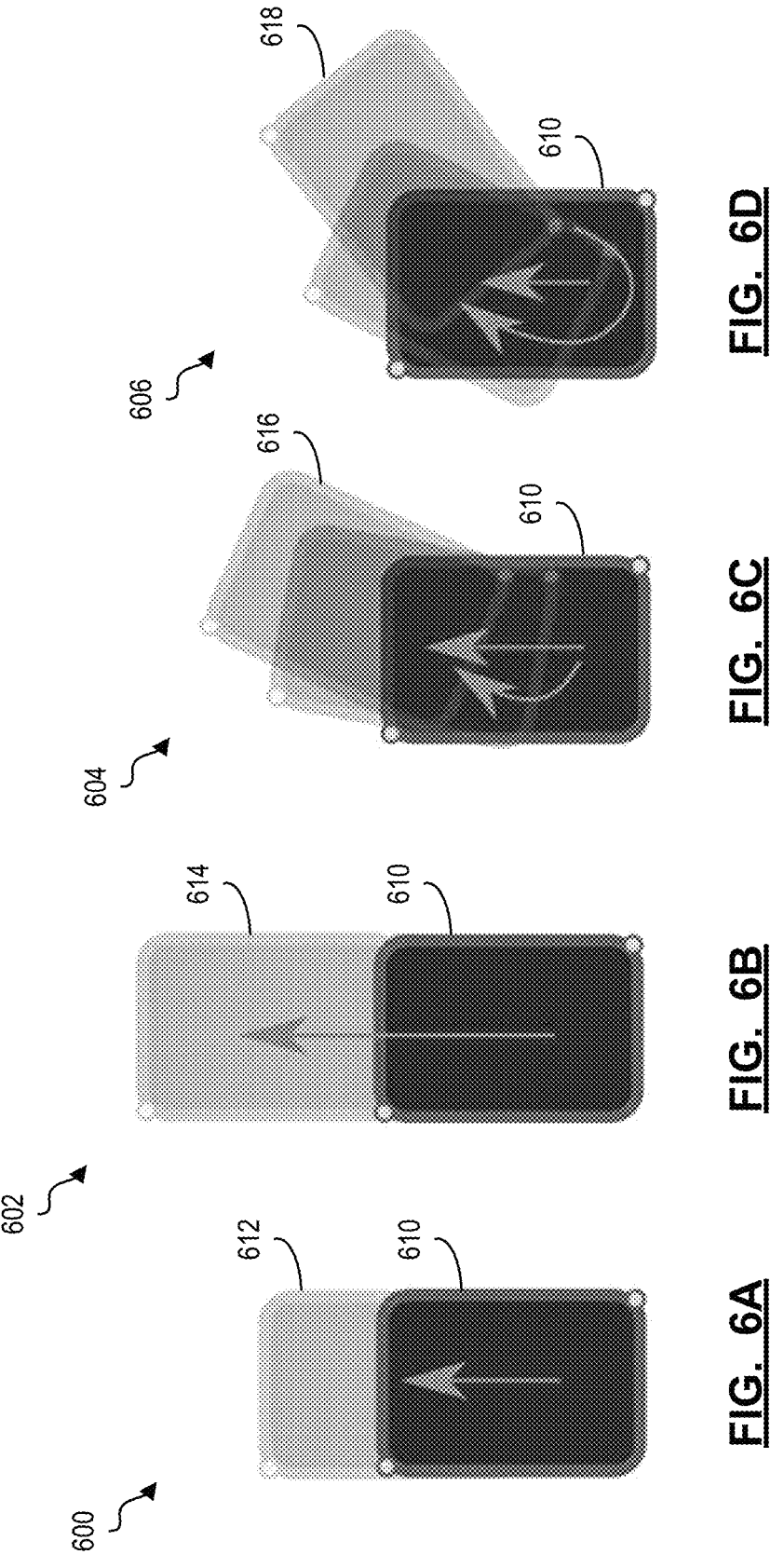

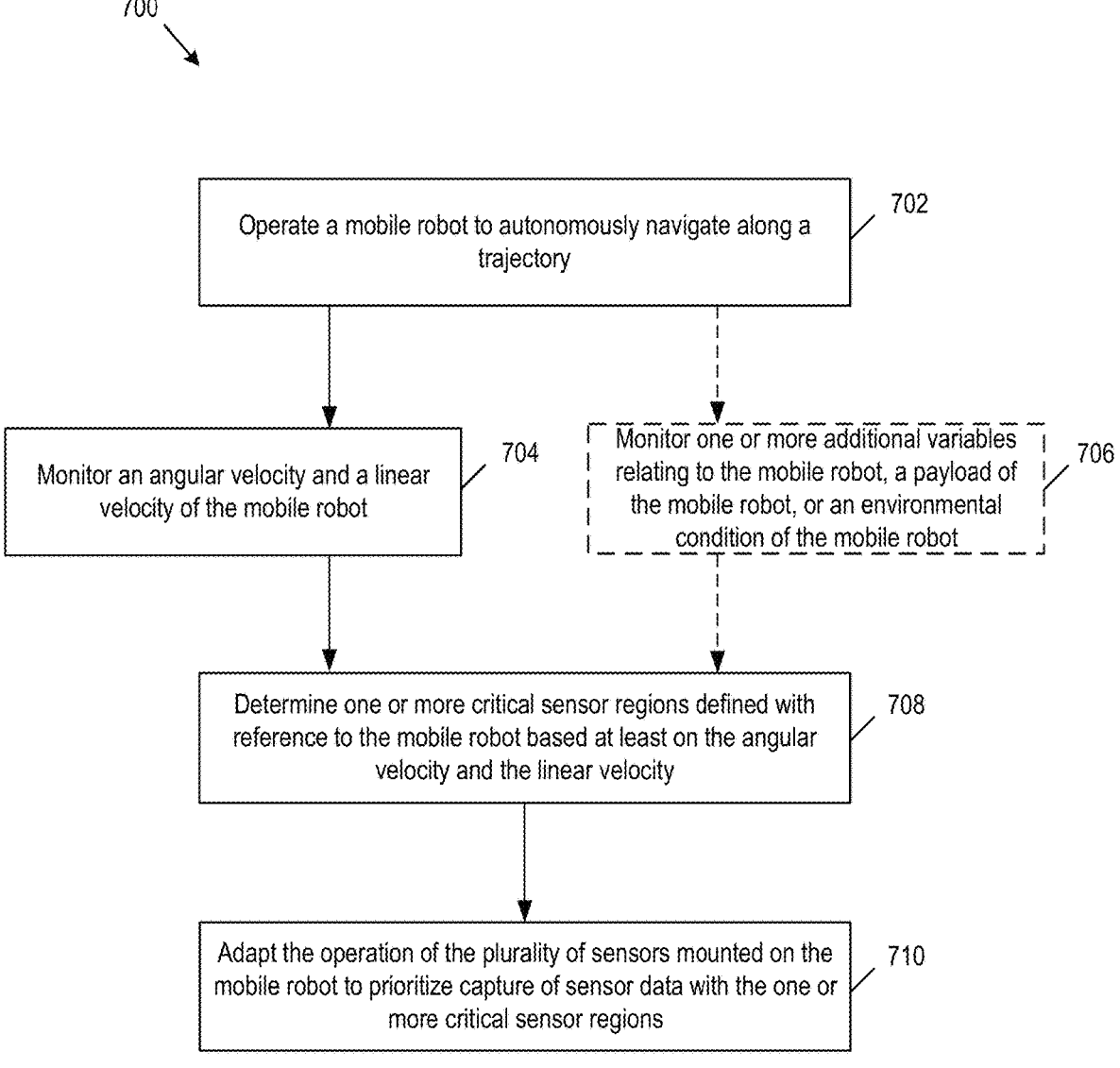

700

702
Operate a mobile robot to autonomously navigate along a trajectory

704
Monitor an angular velocity and a linear velocity of the mobile robot

706
Monitor one or more additional variables relating to the mobile robot, a payload of the mobile robot, or an environmental condition of the mobile robot 708
Determine one or more critical sensor regions defined with reference to the mobile robot based at least on the angular velocity and the linear velocity 710
Adapt the operation of the plurality of sensors mounted on the mobile robot to prioritize capture of sensor data with the one or more critical sensor regions

SYSTEMS AND METHODS FOR OPERATING A MOBILE ROBOT

CROSS-REFERENCE TO RELATED APPLICATION

This application claims priority to U.S. Provisional Patent Application No. 63/407,889 filed Sep. 19, 2022, entitled "SYSTEMS AND METHODS FOR OPERATING A MOBILE ROBOT". The content of U.S. Provisional Patent Application No. 63/407,889 is incorporated herein by reference.

FIELD

The described embodiments relate generally to systems and methods of operating a mobile robot involving adapting the operation of sensors to prioritize capture of sensor data.

BACKGROUND

Mobile robots, also referred to as self-driving vehicles, are increasingly employed in various different settings, including industrial settings such as warehouse facilities. In many cases, mobile robots navigate within their environment to perform tasks, including stopping to drop off or pick up items. In the course of navigating within their environment, the mobile robots need to operate in a safe manner, such as operating to avoid collisions (e.g., with objects or pedestrians).

Many mobile robots rely on a navigation system for autonomous control and a safety system for collision avoidance. During normal operation, the navigation system can control the mobile robot in a manner that avoids triggering the safety system. However, such navigation systems can be limited to simple kinematic and dynamic models, which result in conservative constraints and thus conservative system operation. In addition, such safety systems can involve highly discretized states, likewise negatively impacting performance. Finally, such safety systems can be inflexible and difficult to modify. Furthermore, such navigation and safety systems may not account for a payload that the mobile robot is carrying, and as a result, the navigation and safety systems may try to direct the operation of the mobile robot in a way that does not account for the kinematic and dynamic constraints of the mobile robot due to the payload.

SUMMARY

The various embodiments described herein generally relate to methods (and associated systems configured to implement the methods) for operating a mobile robot having a processor and a plurality of sensors mounted thereon. The method includes operating the mobile robot to autonomously navigate along a trajectory. While the mobile robot autonomously navigates along the trajectory, the method involves operating the processor to: monitor an angular velocity and a linear velocity of the mobile robot; determine one or more critical sensor regions defined with reference to the mobile robot based at least on the angular velocity and the linear velocity of the mobile robot; and adapt the operation of the plurality of sensors to prioritize capture of sensor data within the one or more critical sensor regions. Each sensor can be operable to capture the sensor data for an adjustable detection region defined with respect to the sensor and the mobile robot.

In some embodiments, at least one of the adjustable detection regions can include a sensor range that is variable.

In some embodiments, the method can involve operating the processor to adapt the operation of one or more sensors of the plurality of sensors to adjust the sensor range of each corresponding adjustable detection region to form a sensor region substantially corresponding to the one or more critical sensor regions.

In some embodiments, the one or more critical sensor regions can include a first critical sensor region and a second critical sensor region adjacent to the first critical sensor region.

In some embodiments, the one or more critical sensor regions can include a first critical sensor region and a second critical sensor region distant from the first critical sensor region.

In some embodiments, the one or more critical sensor regions can be asymmetrical.

In some embodiments, the one or more critical sensor regions can be three-dimensional.

In some embodiments, the one or more critical sensor regions can be defined with reference to a body of the mobile robot.

In some embodiments, the one or more critical sensor regions can be defined with reference to a payload of the mobile robot.

In some embodiments, the method can involve operating the processor to monitor the body of mobile robot; and determine the payload of the mobile robot based on the body of the mobile robot.

In some embodiments, the method can involve operating the processor to monitor a weight of the mobile robot; and determine the payload of the mobile robot based on the weight of the mobile robot.

In some embodiments, the one or more critical sensor regions can be defined with reference to an operating mode of the mobile robot.

In some embodiments, the method can involve operating the processor to monitor environmental characteristics of the mobile robot; and change the operating mode of the mobile robot from an initial operating mode to a subsequent operating mode based on the environmental characteristics of the mobile robot.

In some embodiments, the method can involve operating the processor to determine whether the mobile robot is operating in one or more of a narrow zone or a docking zone.

In some embodiments, the method can involve operating the processor to monitor environmental conditions of the mobile robot; and wherein the one or more critical sensor regions can be defined with reference to the environmental conditions of the mobile robot.

In some embodiments, the method can involve operating the processor to identify a surface that the mobile robot is travelling on.

In some embodiments, the method can involve operating the processor to determine whether the mobile robot is travelling on an incline.

In some embodiments, each critical sensor region can include a primary critical sensor region and a secondary critical sensor region, and the method can involve operating the processor to automatically adjust the secondary critical sensor region based on the angular velocity and the linear velocity of the mobile robot.

In some embodiments, the method can involve operating the processor to select a pre-defined primary critical sensor region based on the angular velocity and the linear velocity of the mobile robot.

In some embodiments, the method can involve operating the processor to adjust the trajectory of the mobile robot when an object is detected in the secondary critical sensor region; and stop the mobile robot when an object is detected in the first critical sensor region.

In accordance with another aspect, there is generally disclosed herein systems for operating a mobile robot. The system can include a processor and a plurality of sensors mounted on the mobile robot. Each sensor can be operable to capture sensor data for an adjustable detection region defined with respect to the sensor and the mobile robot. The processor can be operable to autonomously navigate the mobile robot along a trajectory. While the mobile robot autonomously navigates along the trajectory, the processor can be operable to monitor an angular velocity and a linear velocity of the mobile robot; determine one or more critical sensor regions defined with reference to the mobile robot based at least on the angular velocity and the linear velocity of the mobile robot; and adapt the operation of the plurality of sensors to prioritize capture of sensor data within the one or more critical sensor regions.

In some embodiments, at least one of the adjustable detection regions can include a sensor range that is variable.

In some embodiments, the processor can be operable to adapt the operation of one or more sensors of the plurality of sensors to adjust the sensor range of each corresponding adjustable detection region to form a sensor region substantially corresponding to the one or more critical sensor regions.

In some embodiments, the one or more critical sensor regions can include a first critical sensor region and a second critical sensor region adjacent to the first critical sensor region.

In some embodiments, the one or more critical sensor regions can include a first critical sensor region and a second critical sensor region distant from the first critical sensor region.

In some embodiments, the one or more critical sensor regions can be asymmetrical.

In some embodiments, the one or more critical sensor regions can be three-dimensional.

In some embodiments, the one or more critical sensor regions can be defined with reference to a body of the mobile robot.

In some embodiments, the one or more critical sensor regions can be defined with reference to a payload of the mobile robot.

In some embodiments, the processor can be operable to monitor the body of the mobile robot; and determine the payload of the mobile robot based on the body of the mobile robot.

In some embodiments, the processor can be operable to monitor a weight of the mobile robot; and determine the payload of the mobile robot based on the weight of the mobile robot.

In some embodiments, the one or more critical sensor regions can be defined with reference to an operating mode of the mobile robot.

In some embodiments, the processor can be operable to monitor environmental characteristics of the mobile robot; and change the operating mode of the mobile robot from an initial operating mode to a subsequent operating mode based on the environmental characteristics of the mobile robot.

In some embodiments, the processor can be operable to determine whether the mobile robot is operating in one or more of a narrow zone or a docking zone.

In some embodiments, the processor can be operable to monitor environmental conditions of the mobile robot; and the one or more critical sensor regions are defined with reference to the environmental conditions of the mobile robot.

In some embodiments, the processor can be operable to identify a surface that the mobile robot is travelling on.

In some embodiments, the processor can be operable to determine whether the mobile robot is travelling on an incline.

In some embodiments, each critical sensor region can include a primary critical sensor region and a secondary critical sensor region, and the processor is operable to automatically adjust the secondary critical sensor region based on the angular velocity and the linear velocity of the mobile robot.

In some embodiments, the processor can be operable to select a pre-defined primary critical sensor region based on the angular velocity and the linear velocity of the mobile robot.

In some embodiments, the processor can be operable to adjust the trajectory of the mobile robot when an object is detected in the secondary critical sensor region; and stop the mobile robot when an object is detected in the first critical sensor region.

BRIEF DESCRIPTION OF THE DRAWINGS

Several embodiments will now be described in detail with reference to the drawings, in which:

FIG. 6A is a diagram of an example path of an example mobile robot coming to a stop when travelling in a straight path;

FIG. 6B is a diagram of an example path of the example mobile robot coming to a stop when travelling faster than in FIG. 6A;

FIG. 6C is a diagram of an example path of the example mobile robot of FIG. 6A coming to a stop when turning;

FIG. 6D is a diagram of an example path of the example mobile robot coming to a stop when turning more sharply than in FIG. 6C;

FIG. 7 is a flowchart of an example method for operating a mobile robot in accordance with an example embodiment;

Figure 1:
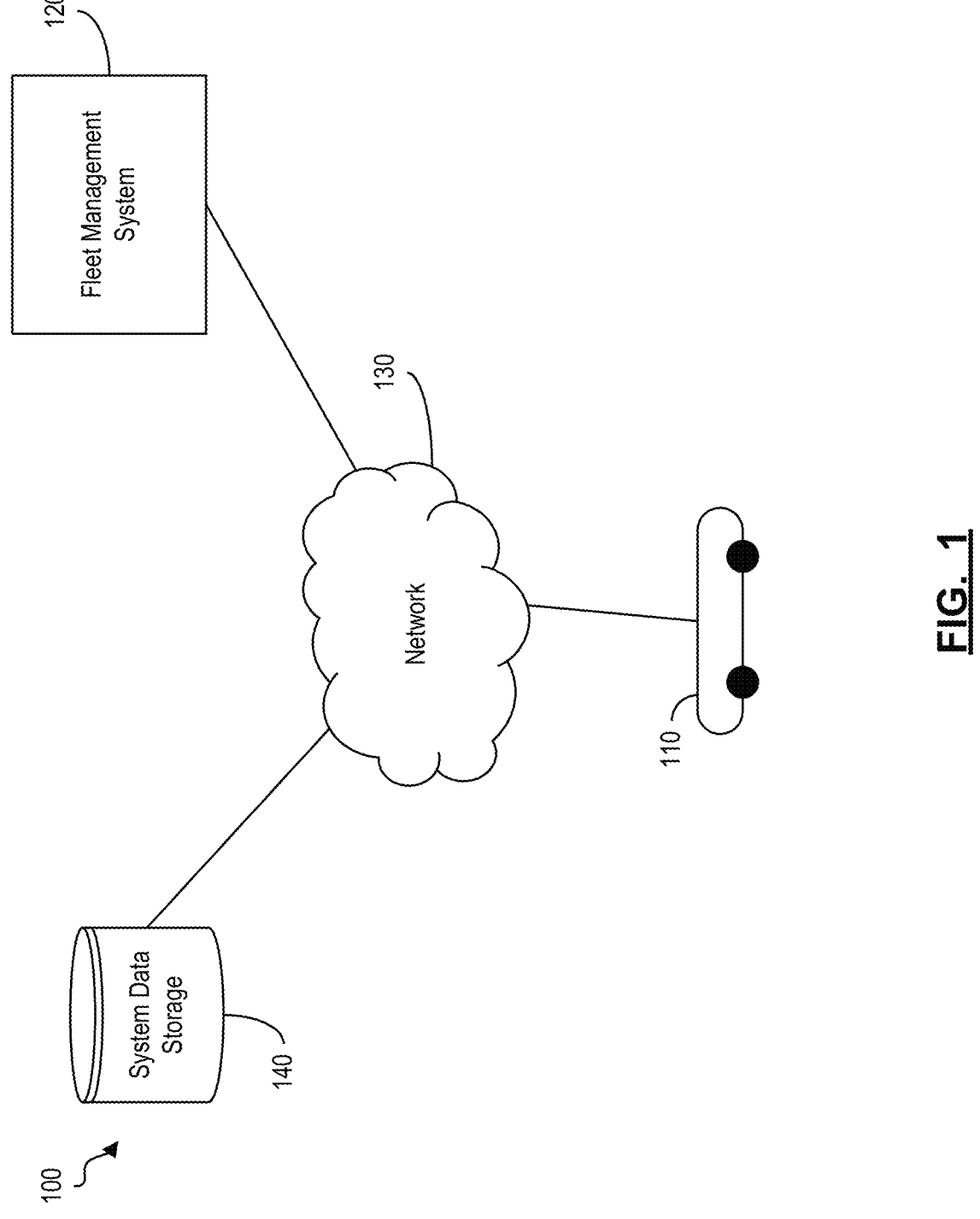
FIG. 1 is a block diagram illustrating an example mobile robot in communication with example components, according to an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Mobile robots may navigate within their environment to perform various tasks. The navigation may be performed by following guiding infrastructure installed in the environment, and/or with reference to an electronic map of the operating environment. In the course of navigating, the mobile robot can operate to avoid obstacles (e.g., objects or pedestrians) along the path.

Many mobile robots have separate, but overlapping systems for navigation and safety. A navigation system can control the mobile robot to navigate autonomously during normal operation. A safety system can monitor the area around the mobile robot and adapt the operation of the mobile robot to avoid potential collisions, and bring the mobile robot to a stop if needed. It is possible for the navigation and safety systems to be implemented on the same physical sensing and/or computing hardware.

Prior navigation systems were limited to simple kinematic and dynamic models. As such, mobile robots were typically restricted to a conservative navigation, such as travelling at slower speeds, accelerating at slower rates, and more cautious turns. Such conservative constraints can be inefficient to the overall operation of the mobile robot, and where applicable, overall fleet operation.

Prior safety systems restricted safety controls of the mobile robots to highly discretized states, which can be inflexible. For example, these safety systems may require the same safety margins regardless of the environment and/or operation of the mobile robot, which can unnecessarily limit the operation of the mobile robot within the environment.

Furthermore, prior navigation and safety systems may not automatically, or at least not efficiently, take into account any payload that the mobile robot may be carrying.

Overall, these prior systems tend to require substantial manual testing and configuration by skilled technicians whenever system parameters change, which can increase costs and time, and compromise system performance and safety.

Disclosed herein are systems and methods for configuring and operating a mobile robot that can enable more flexible and faster navigation within an environment. For example, the disclosed systems and methods can enable the mobile robot to operate closer to its actual dynamic and physical limits. While the mobile robot autonomously navigates within the environment, the processor can operate to monitor an angular velocity and a linear velocity of the mobile robot, and to determine critical sensor region(s) that are defined with reference to the mobile robot based at least on the angular velocity and the linear velocity. The mobile robot can then adapt the operation of the sensors in order to prioritize the capture of sensor data within the critical sensor region(s).

Referring now to FIG. 1, shown therein a block diagram 100 illustrating an example mobile robot 110 in communication with example components. As shown in FIG. 1, the mobile robot 110 can be in communication with a fleet management system 120 and a system data storage 140 via a network 130.

A mobile robot 110 in FIG. 1 is shown for illustrative purposes. More mobile robots 110 can be included. In some example cases, the mobile robot 110 can operate to pick up, transport, and/or drop off materials at various locations.

The network 130 may be any network capable of carrying data, including the Internet, Ethernet, old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the mobile robots 110, the fleet management system 120 and/or the system data storage 140. In some embodiments, the mobile robot 110 can communicate with other robots via the network 130. In some embodiments, the mobile robot 110 can communicate with other robots directly via onboard communication components.

The system data storage 140 can store data related to the mobile robots 110 and/or the fleet management system 120. The system data storage 140 can include RAM, ROM, one or more hard drives, one or more flash drives or some other suitable data storage elements such as disk drives, etc.

The system data storage 140 can also store electronic maps related to the operating environment of the mobile robot 110. The electronic maps located on system data storage 140 can be accessible for download, via the network 130, by the fleet management system 120 and the mobile robot 110. In some embodiments, the electronic map can be generated and updated by the fleet management system 120 based on information received from the mobile robot 110. In some embodiments, the system data storage 140 can be located at the fleet management system 120.

The illustrated FIG. 1 includes the fleet management system 120. The fleet management system 120 can operate to direct and/or monitor the operation of the mobile robot 110. In some embodiments, the mobile robot 110 can operate within a decentralized network—without, or at least with minimal, involvement of the fleet management system 120.

The fleet management system 120 can include a processor, a data storage, and a communication component (not shown). For example, the fleet management system 120 can be any computing device, such as, but not limited to, an electronic tablet device, a personal computer, workstation, server, portable computer, mobile device, personal digital assistant, laptop, smart phone, WAP phone, an interactive television, video display terminals, gaming consoles, and portable electronic devices or any combination of these. The components of the fleet management system 120 can be provided over a wide geographic area and connected via the network 130.

The processor of the fleet management system 120 can include any suitable processors, controllers or digital signal processors that can provide sufficient processing power depending on the configuration, purposes and requirements of the fleet management system 120. In some embodiments, the processor can include more than one processor with each processor being configured to perform different dedicated tasks.

The data storage of the fleet management system 120 can include random access memory (RAM), a read-only memory (ROM), an erasable programmable read-only memory (EPROM, EEPROM, or Flash memory), one or more hard drives, one or more flash drives or some other suitable data storage elements such as disk drives, etc. The communication component of the fleet management system 120 can include any interface that enables the fleet management system 120 to communicate with other devices and systems. In some embodiments, the communication component can include at least one of a serial port, a parallel port or a USB port. The communication component may also include at least one of an Internet, Local Area Network (LAN), Ethernet, Firewire, modem or digital subscriber line connection. Various combinations of these elements may be incorporated within the communication component. For example, the communication component may receive input from various input devices, such as a mouse, a keyboard, a touch screen, a thumbwheel, a track-pad, a track-ball, a card-reader, voice recognition software and the like depending on the requirements and implementation of the fleet management system 120.

In some embodiments, the fleet management system 120 can generate commands for the mobile robots 110. For example, the fleet management system 120 can generate and transmit navigational commands to the mobile robot 110. The navigational commands can direct the mobile robot 110 to navigate to one or more waypoints or destination locations located within the operating environment of the mobile robot 110. For example, the destination locations can correspond to locations where the mobile robot 110 is required to pick up or drop off loads.

In some embodiments, the fleet management system 120 can transmit the destination locations to the mobile robot 110 and the mobile robot 110 can then navigate itself to the waypoints or destination locations. The fleet management system 120 can transmit the destination locations in various formats, such as, but not limited to, a set of Global Positioning System (GPS) coordinates, or coordinates defined relative to an electronic map accessible to the mobile robot 110 and the fleet management system 120. The destination locations, in some embodiments, can be identified with respect to known objects or landmarks within the operating environment of the mobile robot 110. For example, the mobile robot 110 can identify the location of the object or landmark on an electronic map, and navigate to the object or landmark.

The fleet management system 120 can also receive data from the mobile robot 110. For example, the mobile robot 110 can transmit operating data about objects identified during its operation that appear inconsistent with the electronic map. The fleet management system 120 can receive the operating data and update the electronic map, as necessary. In the case that the identified object is obstructing the operation of the mobile robot 110, the fleet management system 120 can transmit updated navigation commands to the mobile robot 110 to guide the mobile robot 110 around the object.

Figure 2:
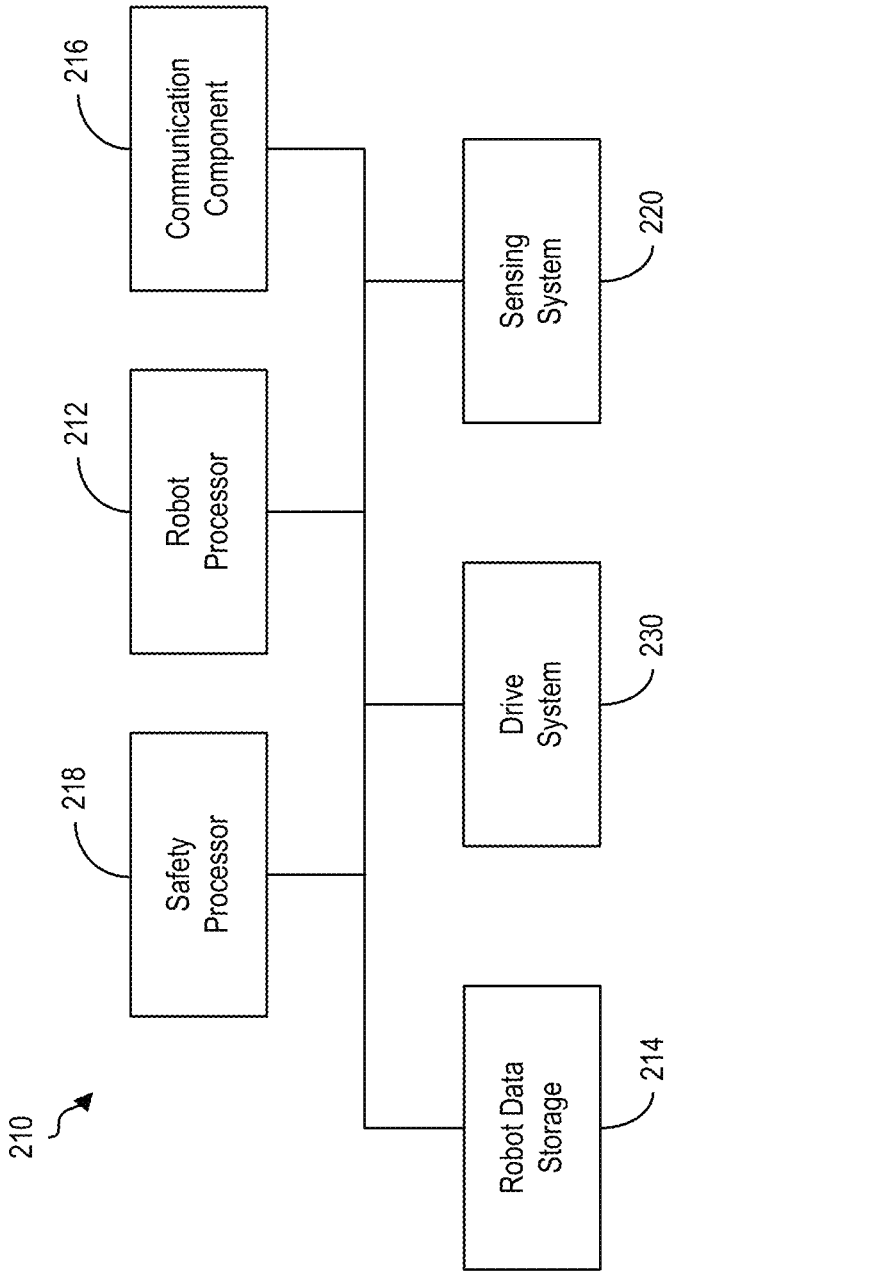
FIG. 2 is a block diagram of example components of an example mobile robot.

Referring now to FIG. 2, shown therein a block diagram 200 of example components of an example mobile robot 210.

The mobile robot 210 can include a robot processor 212, a robot data storage 214, a communication component 216, a safety processor 218, a sensing system 220, and a drive system 230. Components 212, 214, 216, 218, 220, and 230 are illustrated separately in FIG. 2. In some embodiments, one or more of the components 212, 214, 216, 218, 220, and 230 can be combined into fewer components, or separated into further components. For example, the robot processor 212 and the safety processor 218 can be combined in the same component. In some embodiments, parts of a component can be combined with another part of another component.

The robot processor 212 and the safety processor 218 can each include any suitable processor, controller or digital signal processor that can provide sufficient processing power and reliability depending on the configuration, purposes and requirements of the mobile robot 210. In some embodiments, the robot processor 212 and the safety processor 218 can each include more than one processor with each processor being configured to perform different dedicated tasks.

The robot processor 212 and the safety processor 218 can each operate the robot data storage 214, the communication component 216, the sensing system 220, and the drive system 230. For example, the robot processor 212 and the safety processor 218 can each operate the drive system 230 to navigate to the waypoints or destination location as identified by a fleet management system, such as fleet management system 120. The robot processor 212 and the safety processor 218 can each also operate the drive system 230 to avoid collisions with objects detected in the mobile robot's proximity and bring the mobile robot to a stop, or rest position. The operation of the robot processor 212 and the safety processor 218 can each be based on data collected from the robot data storage 214, the communication component 216, the sensing system 220, and/or the drive system 230, in some embodiments.

Given waypoints or a destination location, the robot processor 212 can determine a trajectory to the destination location. A trajectory can be defined as a time-parameterized path and a path can be defined based on a series of positions, which may or may not include headings. Different trajectories can relate to the same path as a mobile robot may follow the same path but at different speeds.

The robot data storage 214 can include RAM, ROM, one or more hard drives, one or more flash drives or some other suitable data storage elements such as disk drives, etc. For example, the robot data storage 214 can include volatile and non-volatile memory. Non-volatile memory can store computer programs consisting of computer-executable instructions, which can be loaded into the volatile memory for execution by the robot processor 212 or the safety processor 218. Operating the robot processor 212 to carry out a function can involve executing instructions (e.g., a software program) that can be stored in the robot data storage 214 and/or transmitting or receiving inputs and outputs via the communication component 216. The robot data storage 214 can also store data input to, or output from, the robot processor 212 or the safety processor 218, which can result from the course of executing the computer-executable instructions for example.

In some embodiments, the robot data storage 214 can store data related to the operation of the mobile robot 210, such as one or more electronic maps of its operating environment and/or operating parameters. The robot data storage 214 can store data tables, data processing algorithms (e.g., image processing algorithms), as well as other data and/or operating instructions which can be used by the robot processor 212 or the safety processor 218. The robot processor 212 and the safety processor 218 can each operate to process data received from the sensing system 220.

The communication component 216 can include any interface that enables the mobile robot 210 to communicate with other components, and external devices and systems. In some embodiments, the communication component 216 can include at least one of a serial port, a parallel port or a USB port. The communication component 216 may also include a wireless transmitter, receiver, or transceiver for communicating with a wireless communications network (e.g., using an IEEE 802.11 protocol or similar). The wireless communications network can include at least one of an Internet, Local Area Network (LAN), Ethernet, Firewire, modem or digital subscriber line connection. Various combinations of these elements may be incorporated within the communication component 216. For example, the communication component 216 may receive input from various input devices, such as a mouse, a keyboard, a touch screen, a thumbwheel, a track-pad, a track-ball, a card-reader, voice recognition software and the like depending on the requirements and implementation of the mobile robot 210. For example, the communication component 216 can receive commands and/or data from the fleet management system 120 and/or another mobile robot (e.g., another mobile robot operating within the operating environment).

The communication component 216 can receive information about obstacles and/or unexpected objects located in the mobile robot's operating environment directly from other mobile robots within the same operating environment and/or indirectly via the fleet management system 120. The robot processor 212 can update an electronic map stored in the robot data storage 214 with this information, for example. The robot processor 212 may also transmit, via the communication component 216 for example, information related to obstacles and/or unexpected objects identified in its operating environment to other mobile robots directly or indirectly via the fleet management system 120.

The sensing system 220 can monitor the environment of the mobile robot 210. The sensing system 220 can include one or more sensors for capturing information related to the environment. The information captured by the sensing system 220 can be applied for various purposes, such as localization, navigation, mapping and/or collision avoidance. For example, the sensing system 220 can include optical sensors equipped with depth perception capabilities, infrared (IR) capabilities, or sonar capabilities. The optical sensors can include imaging sensors (e.g., photographic and/or video cameras), and range-finding sensors (e.g., time of flight sensors, Light Detection and Ranging (LiDAR)

devices which generate and detect reflections of pulsed laser from objects proximal to the mobile robot 210, etc.). The sensing system 220 can also include navigational sensors, such as ground positioning system (GPS) sensors, as well as sensors that detect guiding infrastructure installed within the operating environment. Example sensors that detect guiding infrastructure can include, but not limited to, magnetic sensors that detect magnetic tape within a facility warehouse, and/or optical sensors that detect visual navigational indicators within the operating environment. The sensing system 220 can include proximity sensors that detect people within a proximity of the mobile robot 210.

The sensing system 220 can also monitor the operation of the mobile robot 210. The sensing system 220 can include example sensors, such as encoders, arranged to measure the speed of a wheel of the mobile robot 210, the traction of the mobile robot 210, or the tilt angle of the mobile robot 210. In some embodiments, encoders are provided for each wheel. On tricycle mobile robots, encoders can measure the steering angle along with the drive velocity. The sensing system 220 can include sensors to measure the presence, the mass, or the type of a payload of the mobile robot 210.

The sensing system 220 can monitor continuous variables and/or discrete variables. For example, continuous variables can relate to speed, velocity, traction, steering angle, tilt angle, and/or payload mass measurements while discrete variables can relate to the presence of a payload, the type of payload, and/or the presence of a human within a proximity of the mobile robot 210.

The sensing system 220 can include one or more components that control the operation of the sensors. For example, the components can include, but is not limited to, one or more processors, programmable logic controllers (PLCs), motor contactors, and/or relays. In some embodiments, the sensing processors can receive data collected by the sensors and process the collected data. The sensing processors can operate independently from the robot processor 212 and the safety processor 218. In some embodiments, the sensing system 220 can receive the data collected by the sensors and transmit the collected data to the robot processor 212 and the safety processor 218 for processing. In other embodiments, the sensing system 220 can directly incorporate functionality from the safety processor 218.

The drive system 230 can include the components required for steering and driving the mobile robot 210. For example, the drive system 230 can include the steering component and drive motor.

Figure 3:
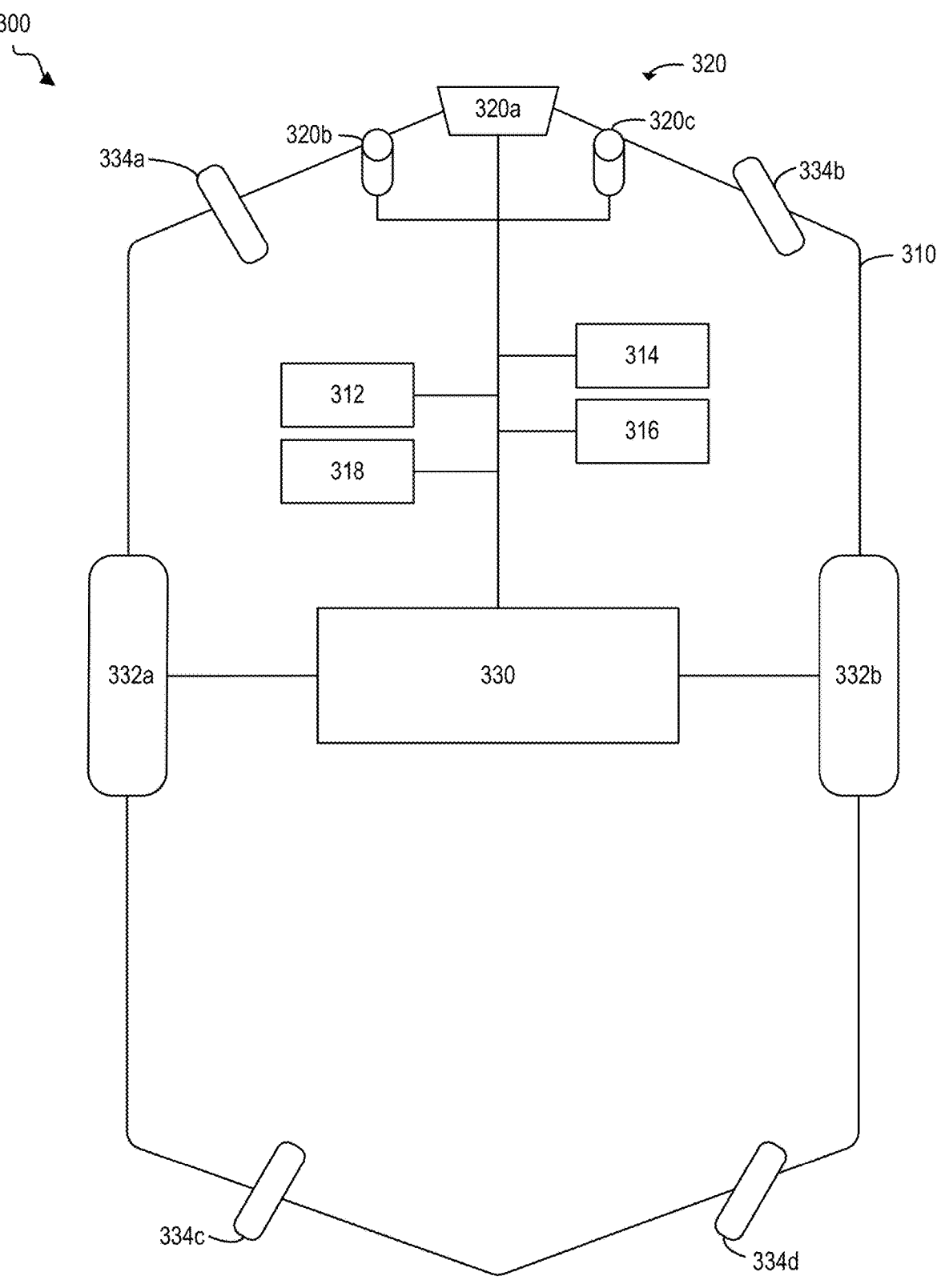
FIG. 3 is a block diagram of example components of another example mobile robot.

Referring now to FIG. 3, shown therein is a block diagram 300 of example components of another example mobile robot 310. The mobile robot 310 shown in FIG. 3 can act as a mobile robot for transporting objects between different locations. The mobile robot 310 can include a cargo component for carrying loads. For example, the cargo component can be a flatbed or a bucket having sidewalls to prevent loads from falling out as the mobile robot 310 moves. The mobile robot 310 can include cargo securing mechanisms to secure the load and prevent the load from falling off the mobile robot 310. The mobile robot 310 can include flexible components, which may be removed from the mobile robot 310. For example, a cargo securing mechanism may be removable when not in use. Although the mobile robot 310 can act as a transport robot, the mobile robot 310 is not limited to transporting objects.

Similar to the mobile robot 210 of FIG. 2, the mobile robot 310 includes a drive system 330, a sensing system 320, a robot processor 312, a robot data storage 314, a communication component 316, and a safety processor 318.

The drive system 330 includes a motor and/or brakes connected to drive wheels 332a and 332b for driving the mobile robot 310. The motor can be, but is not limited to, an electric motor, a combustion engine, or a combination/hybrid thereof. Depending on the application of the mobile robot 310, the drive system 330 may also include control interfaces that can be used for controlling the drive system 330. For example, the drive system 330 may be controlled to drive the drive wheel 332a at a different speed than the drive wheel 332b in order to turn the mobile robot 310. Different embodiments may use different numbers of drive wheels, such as two, three, four, etc.

A number of wheels 334 may be included. The mobile robot 310 includes wheels 334a, 334b, 334c, and 334d. The wheels 234 may be wheels that are capable of allowing the mobile robot 310 to turn, such as castors, omni-directional wheels, and mecanum wheels. In some embodiments, the mobile robot 310 can be equipped with special tires for rugged surfaces or particular floor surfaces unique to its environment.

The sensing system 320 in FIG. 3 includes example sensors 320a, 320b, and 320c. The sensors 320a, 320b, 320c can include, but are not limited to, optical sensors arranged to provide three-dimensional (e.g., binocular or RGB-D) imaging, two-dimensional laser scanners, and three-dimensional laser scanner.

The positions of the components 334, 320, 340, 330, 332 of the mobile robot 310 is shown for illustrative purposes and are not limited to the illustrated positions. Other configurations of the components 334, 320, 340, 330, 332 can be used depending on the application of the mobile robot 310 and/or the environment in which the mobile robot 310 will be used.

Figure 4B:
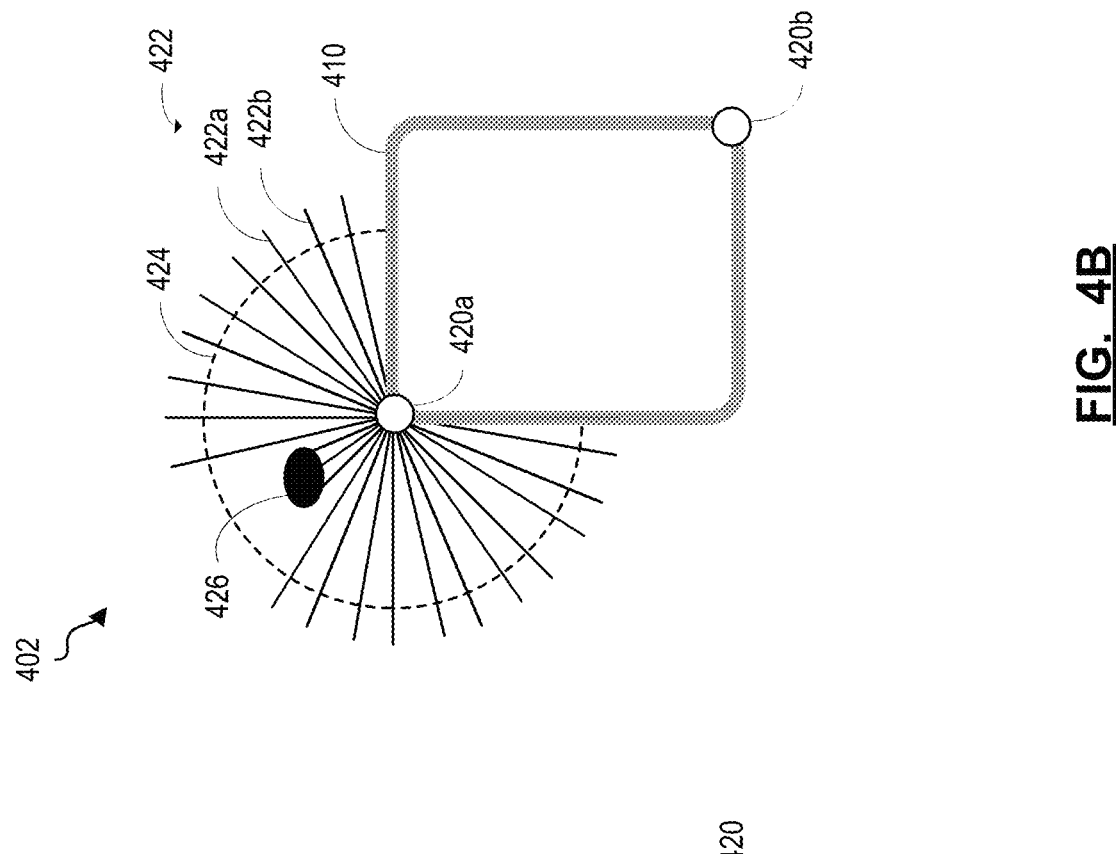
FIG. 4B is a diagram illustrating another example operation of the sensors of the example mobile robot shown in FIG. 4A in accordance with an example embodiment.
Figure 4A:
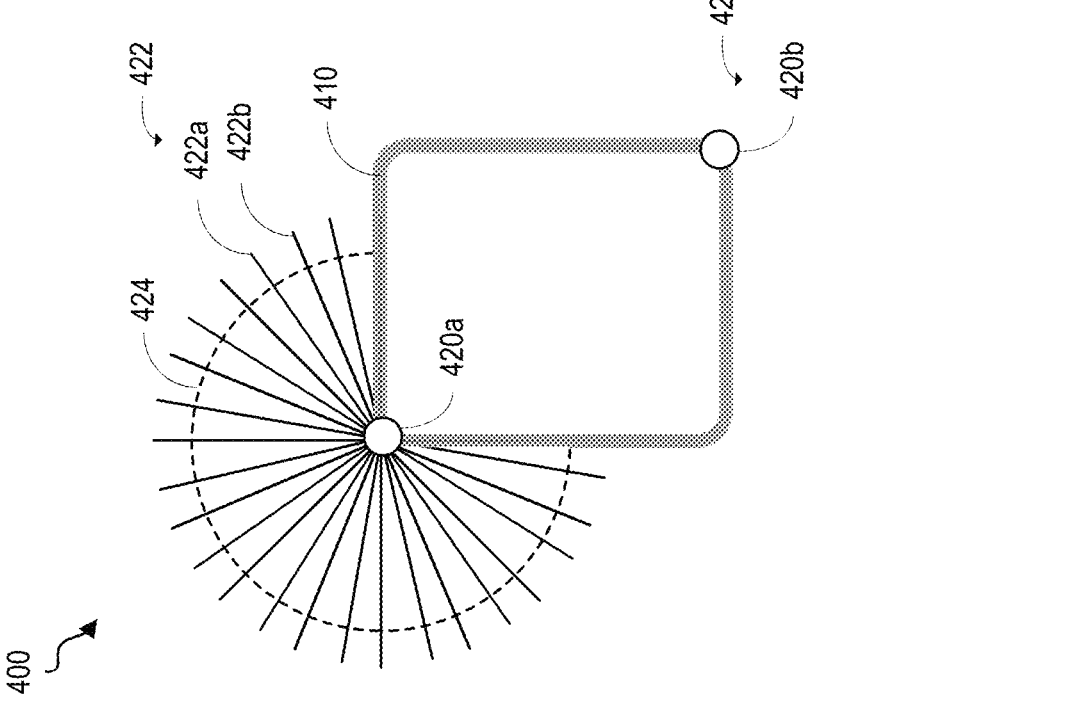
FIG. 4A is a diagram illustrating an example operation of sensors of an example mobile robot in accordance with an example embodiment.

Referring now to FIGS. 4A and 4B, shown therein are diagrams 400 and 402 of example operations of a sensing system 420 of a mobile robot 410. Although not shown, the mobile robot 410 can include a robot processor 212 and a safety processor 218, similar to the mobile robots 210 and 310 of FIGS. 2 and 3, respectively.

The sensing system 420 in FIGS. 4A and 4B include example sensors 420a and 420b. Although only two sensors are shown, the mobile robot 410 can include fewer or more sensors. The sensors 420a and 420b can estimate the relative range and bearing of objects within a proximity of the mobile robot 410. For example, the sensors 420a and 420b can be, but are not limited to, Light Detection and Ranging (LiDAR) devices. LiDAR devices can operate to generate infrared pulsed laser and detect distances, such as distances 422a and 422b from an object, such as object 426 shown in FIG. 4B. Other sensors may include depth cameras, stereo camera pairs, and monocular cameras enabled with appropriate object detection algorithms. Each of the sensors 420a, 420b can detect objects within a sensor detection region. Example sensor detection region 424 for sensor 420a is illustrated in FIGS. 4A and 4B.

The sensor detection regions 424 can be adjustable. Adjusting the sensor detection regions 424 can involve changing the scan rate, the angular resolution, the linear resolution, the spectrum, and/or other such properties of the sensors. For example, the safety processor 218 can adjust the sensor detection regions 424 by varying a range of the sensors 420a, 420b. In some embodiments, varying a range of the sensor can involve selecting between pre-defined sensor detection regions. In the example shown in FIGS. 4A and 4B, when the safety processor 218 adjusts the range of the sensors 420a, 420b, the range of the resulting pulsed laser would be adjusted such that the overall sensor detection region 424 would be adjusted accordingly. In some embodiments, the safety processor 218 can adjust the range of the sensors to change the behavior of the mobile robot when an object 426 is detected.

The sensing system 420 can include multiple sensors that are located in proximity to each other on the mobile robot 410. The safety processor 218 can operate the sensing system 420 to vary the operation of each sensor. As will be described, the sensing system 420 can vary the operation of each sensor differently so that the resulting sensor detection region combined from each of the sensor detection regions of each sensor form different shapes as required for adapting to the operation and/or environment of the mobile robot 410. The resulting overall sensor detection region can be symmetrical or asymmetrical, and can be two-dimensional or three-dimensional.

In some embodiments, the sensing system 420 can operate according to a pre-defined configuration stored in the robot data storage 214. In some embodiments, the sensing system 420 can operate according to a pre-defined configuration stored in the sensing system 420.

In some embodiments, the robot processor 212 or the safety processor 218 can operate to adapt an operation of the mobile robot 410 when an object is detected within the sensor detection region 424.

Figure 5:
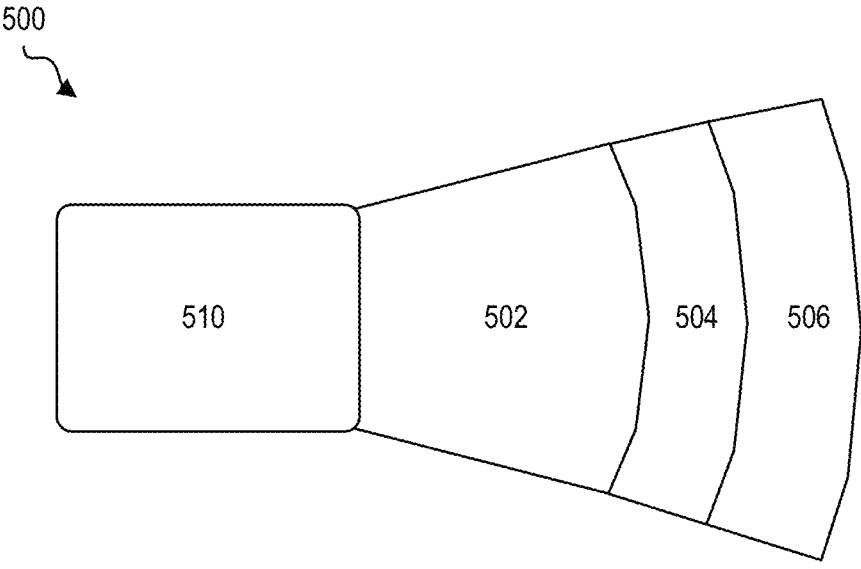
FIG. 5 is a diagram of example sensor detection regions for a sensor of an example mobile robot.

Referring now to FIG. 5, shown therein is a diagram 500 of example sensor detection regions for a sensor of an example mobile robot 510. The sensor can be mounted to the mobile robot 510, such as sensor 420a. The sensor 420a can have an adjustable sensor detection region 424 that is configurable by a processor, such as the safety processor 218. For example, the safety processor 218 can configure the sensor detection region 424 by selecting between pre-defined sensor detection regions. FIG. 5 shows different sensor detection regions, 502, 504 and 506, for the mobile robot 510.

When the mobile robot 510 is travelling straight at a low speed, the stopping path required for the mobile robot 510—that is, the series of positions of the mobile robot 510 as it comes to a stop—is generally shorter (in comparison to when the mobile robot 510 travels at a higher speed). When the mobile robot 510 operates at a lower speed, the safety processor 218 can then operate the sensing system 420 to operate with a smaller sensor detection region 424, such as a shorter-ranged sensor detection region, such as sensor detection region 502 since the sensing system 420 would not need to monitor as far ahead at the lower speed. When the mobile robot 510 travels straight at a higher speed, the stopping path required will generally be longer and the safety processor 218 can then adapt the sensing system 420 to provide a longer-ranged sensor detection region 424, such as sensor detection region 504. Similarly, the safety processor 218 can adapt the sensor detection region 424 to be even longer (such as sensor detection region 506) when the mobile robot 510 is travelling an even higher speed. In some embodiments, the robot processor 424 can adapt the sensor detection region 424 based on other factors such that the sensor detection region 424 may be the same as when the mobile robot travels at a low or high speed. For example, the sensor detection region 424 may be longer even at low speed when the safety processor 218 determines that the mobile robot 510 is operating in rugged terrain, and/or the mobile robot 510 is operating on a slope, and/or the mobile robot 510 is operating in a traction-degraded state, and/or the mobile robot 510 is carrying a payload.

In some embodiments, velocity ranges (i.e., minimum and maximum speed limits) for the mobile robot 510 can be associated with each sensor detection region 502, 504, and 506. The safety processor 218 can operate the sensing system 420 to detect objects within a pre-defined sensor detection when the velocity of the mobile robot 510 is within a pre-defined velocity range associated with that sensor detection region. For example, the safety processor 218 can select the sensor detection region 502 when the velocity of the mobile robot 510 is within the velocity range associated with the sensor detection region 502. In another example, the safety processor 218 can select the sensor detection region 504 when the velocity of the mobile robot 510 is within the velocity range associated with the sensor detection region 504. In some embodiments, the velocity ranges associated with different sensor detection regions do not overlap.

Referring now to FIG. 7, which is a flowchart of an example method 700 for operating a mobile robot. To assist with the description of method 700, reference will be made simultaneously to FIGS. 8A, 8B, 9, 10A, 10B, 11A, 11B, 12, 13A, 13B, and 14.

Although the following description will refer to mobile robot 110, the mobile robot can be any mobile robot, such as mobile robot 110, 210, 310, 410, 510, 610, 810, 1010, 1110, or 1210. The mobile robot 110 can include a robot processor, such as robot processor 212 or 312, a safety processor, such as safety processor 218 or 318, and a sensing system, such as sensing system 220 or 230. The sensing system 220 can include a plurality of sensors, such as sensors 420a, 420b, mounted thereon.

At 702, the mobile robot 110 autonomously navigates along a trajectory.

At 704, while the mobile robot 110 autonomously navigates along the trajectory, the safety processor 218 can monitor various continuous and/or discrete variables relating to the mobile robot 110. In particular, the safety processor 218 can monitor an angular velocity and a linear velocity of the mobile robot 110. The sensing system 220 can include one or more sensors, such as but not limited to encoders, to measure the angular velocity and/or the linear velocity of the mobile robot 110. The safety processor 218 can receive the angular velocity and the linear velocity from the sensors.

In some embodiments, the safety processor 218 can monitor additional variables while the mobile robot 110 autonomously navigates along the trajectory, as indicated by the dashed lines at 706. The additional variables can relate to the mobile robot 110, including but not limited to, a traction of the mobile robot 110, a steering angle of the mobile robot 110, a tilt angle of the mobile robot 110, a payload of the mobile robot 110 (e.g., a presence of the payload, a mass of the payload, a type of the payload), the environment of the mobile robot 110 (e.g., human proximity, environmental conditions), and any combination thereof. The safety processor 218 can receive the additional variables from the respective sensors.

For example, referring now to FIGS. 6A and 6B, shown therein are diagrams 600 and 602 of example paths 612 and 614 of a mobile robot 610.

In FIG. 6A, the mobile robot 610 can travel along a straight path at a linear velocity, as indicated by the straight arrow. To come to a stop, the mobile robot 610 needs to travel along the stopping path 612 shown in FIG. 6A. The safety processor 218 can operate to monitor the linear velocity of the mobile robot 610. The safety processor 218 can, in some embodiments, account for factors that may affect the operation of the mobile robot 610. For example, the linear velocity detected by the sensing system 220 may be higher than the actual linear velocity of the mobile robot

610 in some cases due to external factors, such as traction loss (e.g., one of the wheels 334 may spin without gripping the ground and the mobile robot 610 may slip).

In FIG. 6B, the mobile robot 610 can travel along a straight path, but at a higher linear velocity than shown in FIG. 6A. To come to a stop from the higher linear velocity, the mobile robot 610 needs to travel along a longer stopping path 614 than the stopping path 612 (as shown in FIG. 6B). Similar to the example shown in FIG. 6A, the safety processor 218 can operate to monitor the linear velocity of the mobile robot 610 in FIG. 6B.

Referring now to FIG. 6C, shown therein is a diagram 604 of another example path 616 of the mobile robot 610. In FIG. 6C, the mobile robot 610 is initiating a right turn, which involves operating the mobile robot 610 at an angular velocity (generally represented by the curved arrow) and a linear velocity (generally represented by the straight arrow). The path 616 illustrates the path in which the mobile robot 610 can take in order to stop during and/or after the turn. The safety processor 218 can operate to monitor the linear velocity and the angular velocity of the mobile robot 610 in FIG. 6C.

Referring now to FIG. 6D, shown therein is a diagram 606 of another example path 618 of the mobile robot 610. In FIG. 6D, as compared with FIG. 6C, the mobile robot 610 is conducting a sharper right turn, which involves a higher angular velocity than that of FIG. 6C (generally represented by the curvier arrow). The path 618 illustrates the path in which the mobile robot 610 can take in order to stop during and/or after the turn. Similarly, the safety processor 218 can operate to monitor the linear velocity and the angular velocity of the mobile robot 610 in FIG. 6D. In some embodiments, the safety processor 218 may need to account for loss of traction during turns (e.g., the wheels 334 may not brake equally resulting in loss of traction and the mobile robot 610 may not follow the original turning path)

At 708, while the mobile robot 110 autonomously navigates along the trajectory, the safety processor 218 can determine critical sensor regions defined with reference to the mobile robot 110 based at least on the angular velocity and the linear velocity of the mobile robot 110. For example, the safety processor 218 can select between pre-defined critical sensor regions based at least on the angular velocity and the linear velocity of the mobile robot 110.

As described with reference to FIGS. 5 and 6A to 6D, the angular velocity and the linear velocity of the mobile robot 110 can affect the path for the mobile robot 110. The safety processor 218 can then determine the critical sensor region to correspond with the path so that any potential collision points are identified for the mobile robot 110. For example, to avoid any potential collisions, the safety processor 218 can adapt the operation of the sensing system 220 so that the resulting sensor detection region 424 corresponds generally to the critical sensor region, which is a region defined based at least on the angular velocity and linear velocity of the mobile robot 110. In some embodiments, the safety processor 218 can define the critical sensor region to at least be sufficient to allow the mobile robot 110 to safely come to a stop, if necessary, before collision. As described, the safety processor 218 can also monitor for factors during the operation of the mobile robot 110 that may bring it out of its original path. For example, the safety processor 218, in some embodiments, can define the critical sensor region such that the sensing system 220 operates to monitor for potential collision points up to when the mobile robot 110 has zero kinetic energy 906 (see e.g., FIG. 9) and when the mobile robot 110 has maximum kinetic energy (i.e., at the upper velocity limit 920).

Figure 8B:
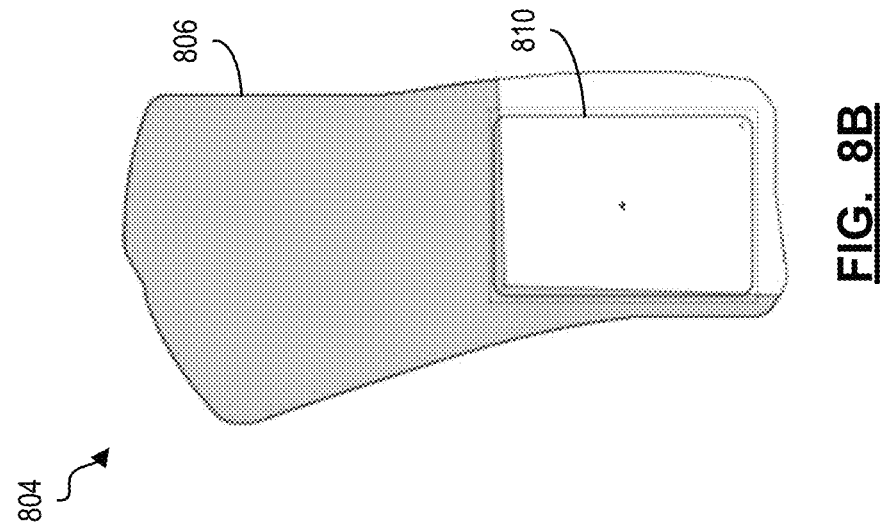
FIG. 8B is a diagram of am example critical sensor region for the example mobile robot of FIG. 8A when turning.
Figure 8A:
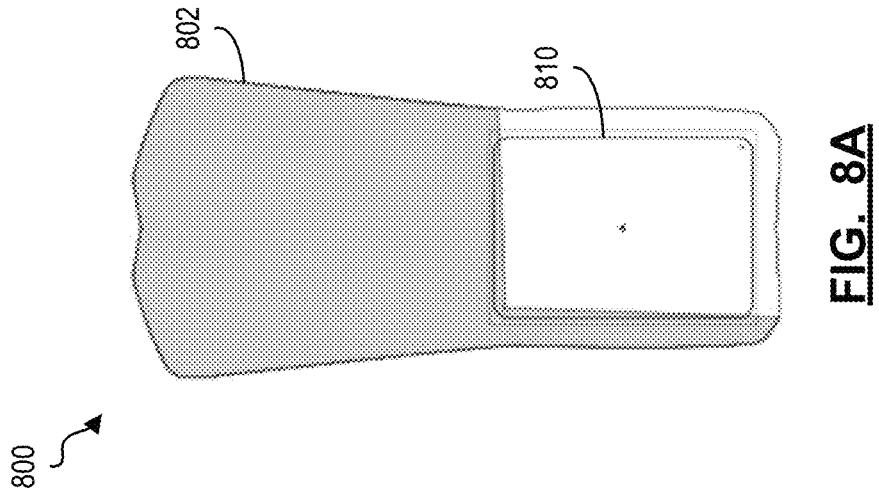
FIG. 8A is a diagram of an example critical sensor region for an example mobile robot when travelling in a straight path in accordance with an example embodiment.

Referring now to FIGS. 8A and 8B, shown therein are diagrams 800 and 804 of example critical sensor regions of an example mobile robot 810. FIG. 8A shows the critical sensor region 802 for the mobile robot 810 when travelling in a straight path. When the mobile robot 810 is travelling in a straight path, the safety processor 218 can determine that the mobile robot 810 is operating at a linear velocity (with none or minimal angular velocity) and can determine that the critical sensor region 802 is generally in front of the mobile robot 810 as that is where the most likely points of collision may be when the mobile robot 810 is operating along this path. The safety processor 218, along with the robot processor 212 can also determine that the mobile robot 810 is soon to make a left turn (e.g., based on its planned trajectory and/or mission). The safety processor 218 can then operate the sensing system 220 to also prioritize monitoring for collision points on the left side of the body of the mobile robot 810 (see generally in FIG. 8A). FIG. 8B shows the safety processor 218 continues to adapt the sensing system 220 as the mobile robot 810 approaches the left turn (despite the mobile robot 810 still operating along a straight path). The safety processor 218 can adapt the sensing system 220 to operate with the critical sensor region 806, which has been adapted to further focus on the left upper region of the body of the mobile robot 810 ahead of its left turn. The critical sensor regions 802 and 806 can be formed by adapting the operation of each sensor 420a, 420b mounted to the body of the mobile robot 810. By adapting the operation of each sensor 420a, 420b, the safety processor 218 can form an overall critical sensor region that focuses on critical areas of higher potential collision points.

Figure 9:
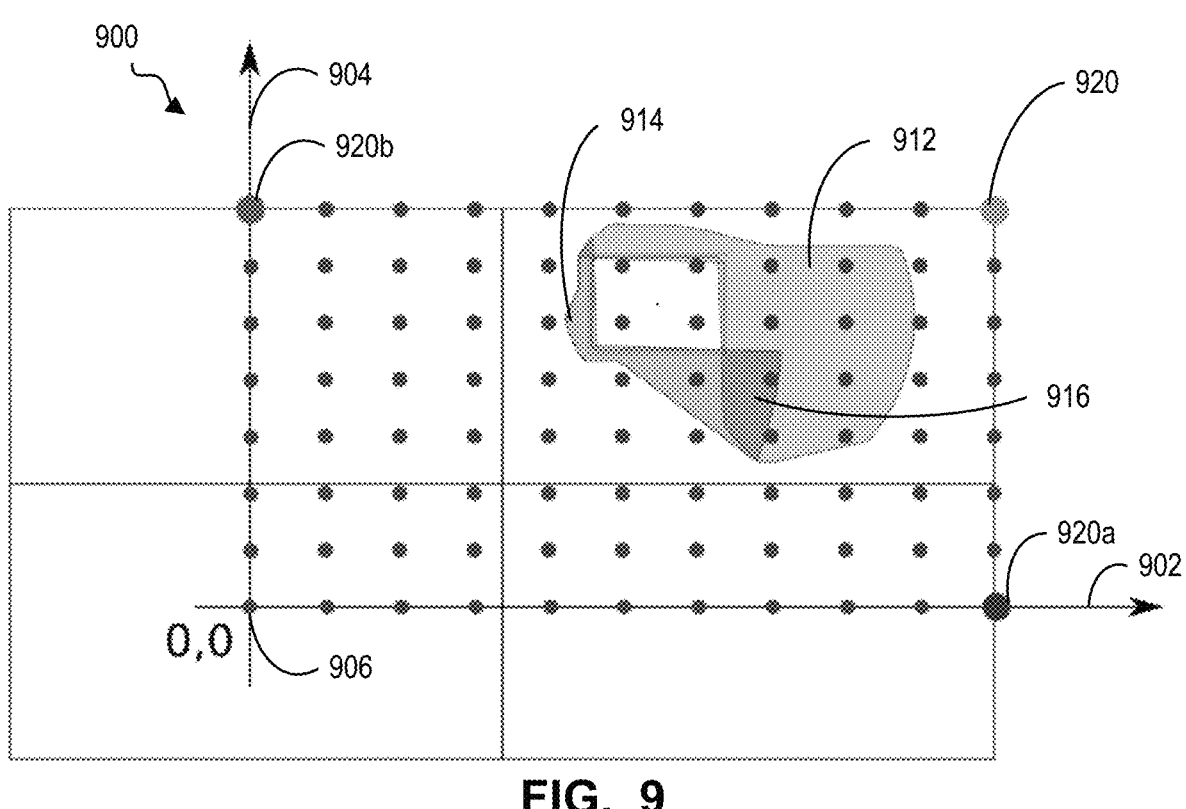
FIG. 9 is a diagram of example multiple critical sensor regions for an example mobile robot in accordance with an example embodiment.

Referring now to FIG. 9, shown therein is a diagram 900 of example multiple critical sensor regions 912, 914 for an example mobile robot 110. Each of the critical sensor regions 912, 914 can be formed by adapting the operation of multiple sensors according to the operation of the mobile robot. It is possible that multiple critical sensor regions 912, 914 overlap, as seen generally at 916 in FIG. 9. The critical sensor regions 912, 914 may also share a common edge in some embodiments.

In some embodiments, the safety processor 218 can adapt the operation of the sensors to form the critical sensor regions based on pre-defined ranges of the angular velocity and the linear velocity. In FIG. 9, the horizontal axis illustrates increasing linear velocity in the forward direction 902 and the vertical axis illustrates increasing angular velocity in the clockwise direction 904. For example, the safety processor 218 can adapt the operation of the sensors to form the critical sensor regions 912, 914 if the angular velocity and the linear velocity of the mobile robot 110 is less than the maximum linear velocity 920a and the maximum angular velocity 920b.

The critical sensor regions 912, 914 can cover potential collision points for various potential paths of the mobile robot 110 within the pre-defined range. For example, the critical sensor regions 912, 914 can cover the potential collision points when the mobile robot 110 travels along a substantially straight path (e.g., with a non-zero linear velocity, up to the maximum linear velocity 920a, and a zero, or near zero angular velocity), when the mobile robot 110 turns in place (e.g., with a non-zero angular velocity, up to the maximum angular velocity 920b, and a zero, or near zero, linear velocity), and when the mobile robot turns right (e.g., with a non-zero linear velocity, up to the maximum linear velocity 920a, and a non-zero angular velocity, up to the maximum linear velocity 920b).

Figure 10A:
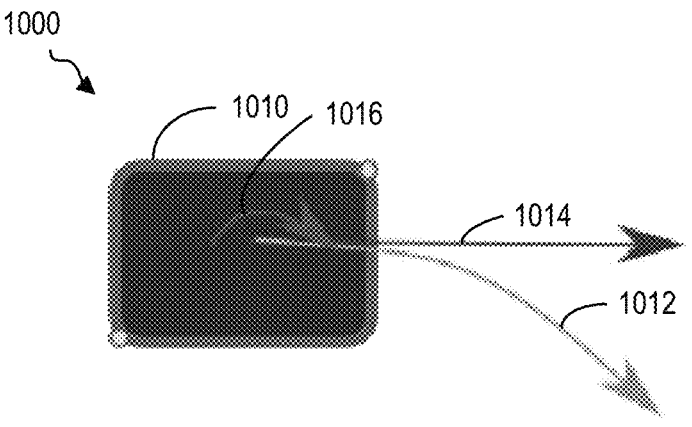
FIG. 10A is a diagram illustrating example paths of an example mobile robot operating at different velocities.

Referring now to FIG. 10A, shown therein is a diagram 1000 of an example mobile robot 1010 with example paths generally shown with arrows 1012, 1014, 1016.

Figure 10B:
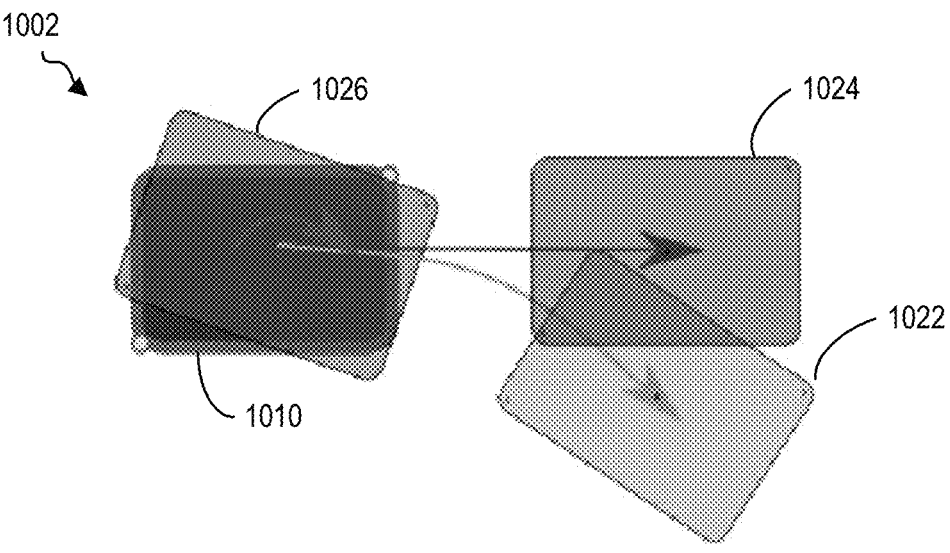
FIG. 10B is a diagram illustrating example stopping paths for the respective different velocities at which the example mobile robot is operating as shown in FIG. 10A.

Path 1012 represents a path in which the mobile robot 1010 will turn right. During this path 1012, the mobile robot 1010 will operate at a non-zero linear velocity and a non-zero angular velocity. Path 1014 represents a path in which the mobile robot 1010 will travel along a straight path (e.g., with a non-zero linear velocity and a zero, or near zero, angular velocity). Path 1016 represents a path in which the mobile robot 1010 is turning in place (e.g., with a non-zero angular velocity and a zero, or near zero, linear velocity). FIG. 10B shows the mobile robot 1010 travelling along paths 1012 (with the mobile robot 1010 shown generally at 1022 when travelling along the path 1012), 1014 (with the mobile robot 1010 shown generally at 1024 when travelling along the path 1014) and 1016 (with the mobile robot 1010 shown generally at 1026 when travelling along the path 1016).

The paths 1012, 1014, 1016 can be defined based on the distance in which the mobile robot 1010 requires to stop based on, but not limited to, experimental data, simulations, analytical models, including statistical models, or any combination thereof. In some embodiments, the paths 1012, 1014, 1016 can be encoded in the safety processor 218 or stored in the robot data storage 214. Furthermore, the paths 1012, 1014, 1016 can be validated for a particular mobile robot 1010, or globally for a particular model of the mobile robot 1010. The paths 1012, 1014, 1016 can be defined for different translational volumes, rotational volumes, robot sizes, and payloads in some embodiments. In some embodiments, the paths 1012, 1014, 1016 can be formulated in terms of robot lengths, robot velocities, relative robot trajectories, or a combination thereof.

Figure 11A:
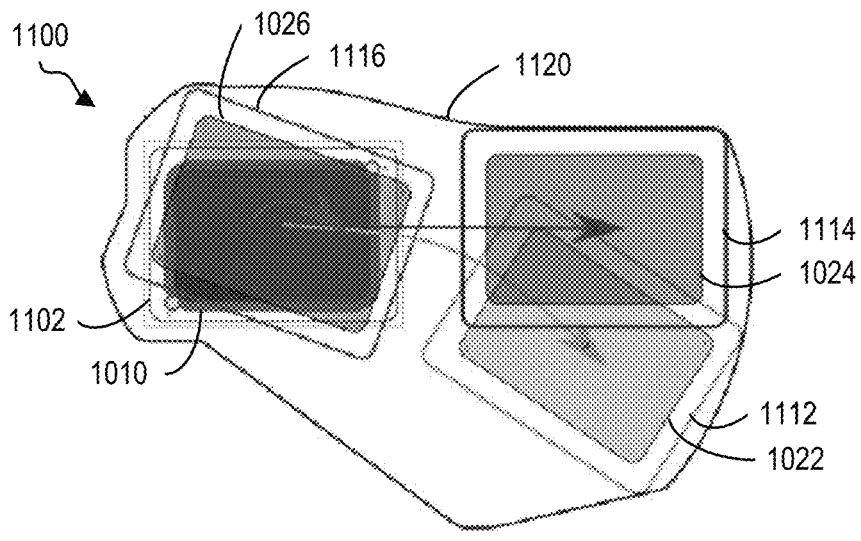
FIG. 11A is a diagram illustrating an example robot buffer region for an example mobile robot in accordance with an example embodiment.
Figure 11B:
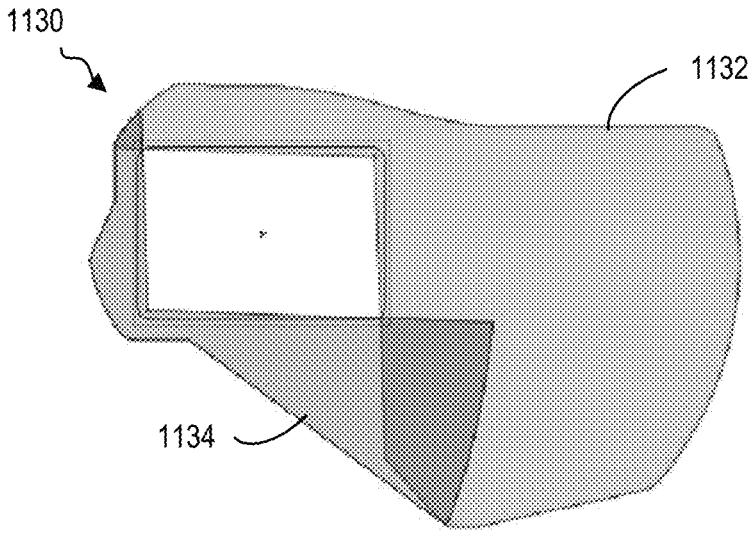
FIG. 11B is a diagram illustrating example critical sensor regions corresponding to the example robot buffer region shown in FIG. 11A in accordance with an example embodiment.

Referring now to FIG. 11A, shown therein is a diagram 1100 illustrating an example robot buffer region 1120 for an example mobile robot 1010. The robot buffer region 1120 can account for paths 1012, 1014, 1016 to ensure that any collision points within that robot buffer region 1120 can be monitored by the sensing system 220. In some embodiments, the safety processor 218 can also include a robot buffer region for the mobile robot 1010 (see e.g., 1102, 1022, 1024, 1026). The safety processor 218 can define the robot buffer region 1120 based on various factors, such as but not limited to, safety requirements, the physical boundary of the mobile robot 1010, the environment in which the mobile robot 1010 will operate, or a combination thereof. FIG. 11B shows the example critical sensor region 1130 defined by the safety processor 218 for the robot buffer region 1120. As can be seen, the safety processor 218 operates the sensing system 220 such that the critical sensor region 1130 corresponds to the robot buffer region 1120.

In some embodiments, the safety processor 218 can determine the critical sensor regions 1132, 1134 based on a computer-generated model of the mobile robot 1110 stored in the system data storage 140. In some embodiments, the safety processor 218 can determine the critical sensor regions 1132, 1134 based on pre-defined sensor regions defined with respect to velocity ranges.

Figure 12:
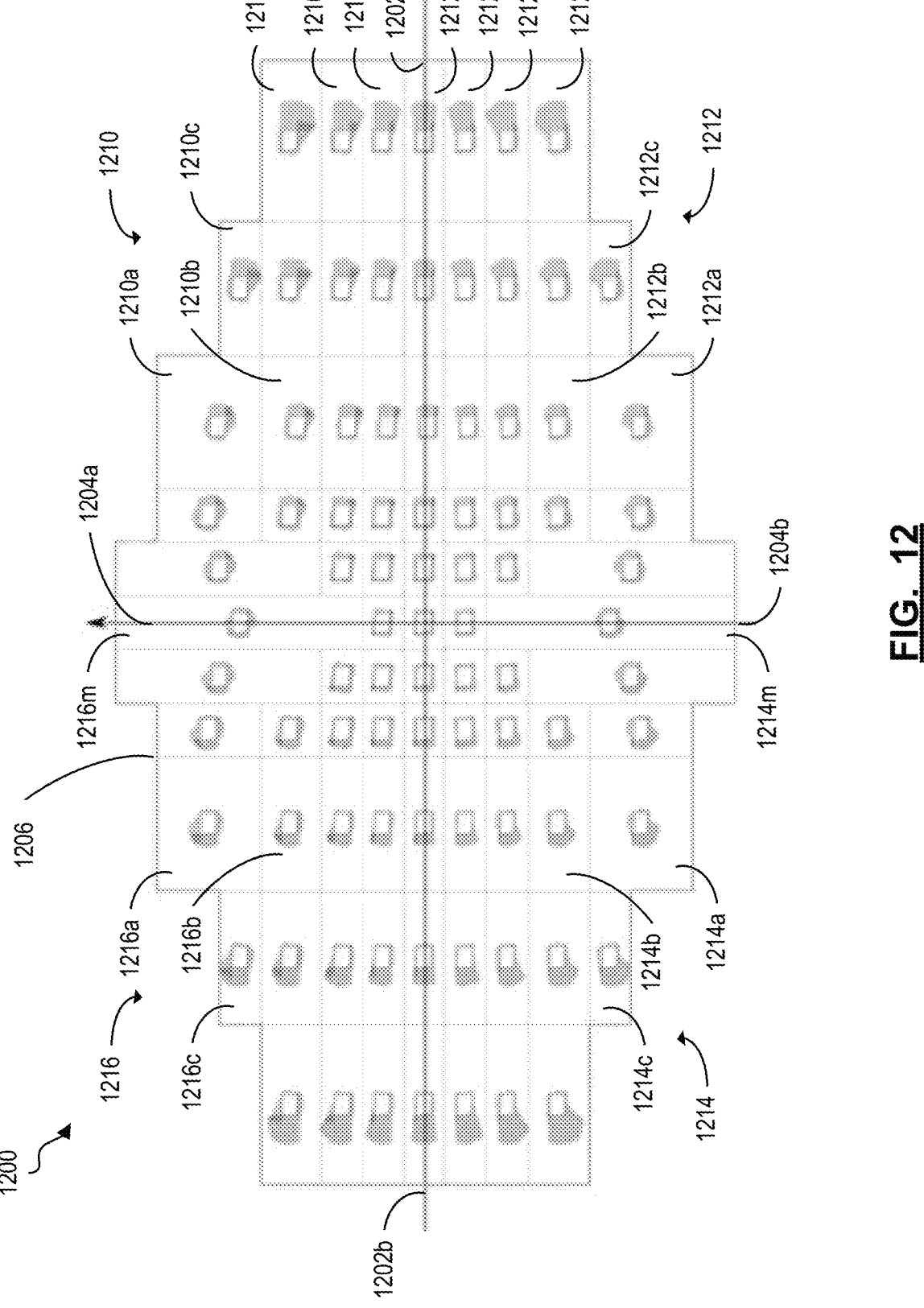
FIG. 12 is a diagram illustrating example critical sensor regions for an example mobile robot operating at various combinations of different angular and linear velocities.

Referring now to FIG. 12, shown therein is a diagram 1200 of example critical sensor regions for various angular and linear velocities for a mobile robot 110. The horizontal axis shows increasing linear velocity in the forward direction 1202a and increasing linear velocity in the backward direction 1202b. The vertical axis shows increasing angular velocity in the clockwise direction 1204*a* and increasing angular velocity in the counter-clockwise direction 1204*b*. The perimeter 1206 shows the maximum velocity envelope of the mobile robot. The maximum velocity envelope defines the permitted angular velocity for each linear velocity. As shown in FIG. 12, the maximum velocity envelope can be a step-wise function.

All combinations of linear and angular velocities can be divided into a plurality of portions. That is, the linear and angular velocities can be discretized. A set of critical sensor regions can be assigned to each portion. When the mobile robot 110 is travelling forward and clockwise, the robot processor 212 can select one of the portions of the upper right quadrant 1210. Depending on the particular angular velocity and linear velocity, the robot processor 212 can determine that the critical sensor regions should be the critical sensor regions of a portion in the upper right quadrant 1210. Although only critical sensor regions 1210*a*, 1210*b*, 1210*c*, 1210*d*, 1210*e*, and 1210*f* are labelled, each of the critical sensor regions of the upper right quadrant 1210 represent the mobile robot travelling forward and clockwise.

When the mobile robot 110 is travelling forward and counter-clockwise, the safety processor 218 can select one of the portions in the lower right quadrant 1212. Depending on the particular angular velocity and linear velocity, the safety processor 218 can determine that the critical sensor regions should be the critical sensor regions of a portion in the lower right quadrant 1212. Although only critical sensor regions 1212*a*, 1212*b*, 1212*c*, 1212*d*, 1212*e*, and 1212*f* are labelled, each of the critical sensor regions of the lower right quadrant 1212 represent the mobile robot 110 travelling forward and counter-clockwise.

When the mobile robot 110 is travelling backward and counter-clockwise, the safety processor 218 can select one of the portions in the lower left quadrant 1214. Depending on the particular angular velocity and linear velocity, the safety processor 218 can determine that the critical sensor regions should be the critical sensor regions of a portion in the lower left quadrant 1214. Although only critical sensor regions 1214*a*, 1214*b*, and 1214*c* are labelled, each of the critical sensor regions of the lower left quadrant 1214 represent the mobile robot 110 travelling backward and counter-clockwise.

When the mobile robot 110 is travelling backward and clockwise, the safety processor 218 can select one of the portions in the upper left quadrant 1216. Depending on the particular angular velocity and linear velocity, the safety processor 218 can determine that the critical sensor regions should be the critical sensor regions of a portion in the upper left quadrant 1216. Although only critical sensor regions 1216*a*, 1216*b*, and 1216*c* are labelled, each of the critical sensor regions of the upper left quadrant 1216 represent the mobile robot 110 travelling backward and clockwise.

Although the portions shown in FIG. 12 are rectangular, the possible combinations of linear and angular velocities can be divided into any manner. The velocity ranges for each portion can be non-uniform. The velocity ranges for each portion can be defined to optimize the portions, thereby reducing data storage requirements. For example, the safety processor 218 can determine that the same set of critical sensor regions, such as critical sensor regions 1214*m* or 1216*m*, can be used for many turns in place (i.e., zero linear velocity and non-zero angular velocity), irrespective of the angular velocity. In some embodiments, an aggregate (i.e., a union) of two similar but not identical critical sensor regions can be defined to optimize data storage requirements while also biasing towards safety.

However, at high linear velocities, slight differences in the angular velocity can significantly change the flare out. Accordingly, the safety processor 218 can select different critical sensor regions 1210*d*, 1210*e*, 1210*f*, 1212*d*, 1212*e*, 1212*f*, and 1212*g*, depending on the angular velocity. That is, the portions can have a higher granularity where there are significant changes to the stopping path.

As well, the combination of critical sensor regions for multiple sensors is generally different across different portions. However, the critical sensor region for a sensor can be the same across different portions. In this manner, the safety processor 218 can reuse a sensor detection region configuration for different portions.

It should be noted that the diagram 1200 shown in FIG. 12 illustrates critical sensor regions for various angular and linear velocities for a particular system state, namely a particular body, payload, operating mode, and environmental conditions of a mobile robot, such as mobile robot 110. However, the critical sensor regions can be further defined with respect to a particular body, payload, operating mode, and environmental conditions of the mobile robot 110.

In some embodiments, at 708, the safety processor 218 can further determine critical sensor regions defined with reference to the mobile robot 110 based on the additional variables monitored at 706. The additional variables can relate to the mobile robot 110 (e.g., traction of the mobile robot 110, steering angle of the mobile robot 110, tilt angle of the mobile robot 110), a payload of the mobile robot 110 (e.g., presence of a payload, mass of the payload, type of the payload), or an environmental condition of the mobile robot 110 (e.g., human proximity, temperature). Accordingly, additional diagrams can illustrate critical sensor regions for various angular and linear velocities for a different system state, such as a different body, payload, operating mode, or environmental condition. The additional diagrams can include additional axes for the additional system states. Furthermore, additional continuous-valued system states, such as but not limited to the tilt angle or payload mass, can be discretized, similar to that of the angular velocity and the linear velocity. The additional diagrams may use similar or different linear and angular velocities limits for each portion as that of diagram 1200.

In some embodiments, the sets of critical sensor regions and corresponding discrete system states can be stored as a lookup table in the robot data storage 214 and accessed by the safety processor 218 or encoded in the safety processor 218.

Figure 13A:
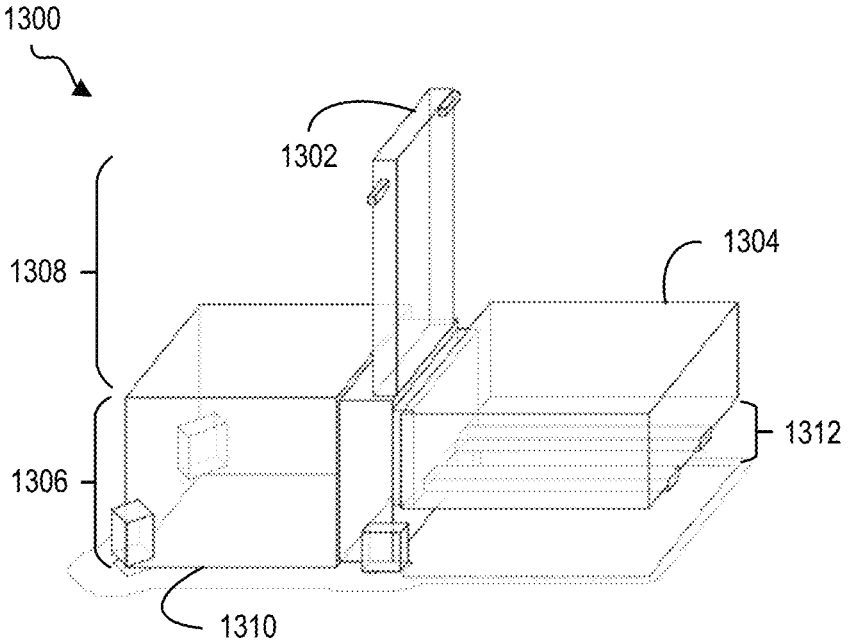
FIG. 13A illustrates an example mobile robot carrying a payload with an example robot buffer region shown in accordance with an example embodiment.

Referring now to FIG. 13A, shown therein is an illustration 1300 of an example mobile robot 1310 carrying an example payload 1304. The body of a mobile robot 1310, or the physical shape of the mobile robot 1310, can include various protrusions and overhangs, resulting in non-uniform heights, widths, or lengths. As shown in FIG. 13A, the mobile robot 1310 includes a frame portion 1302.

However, the frame portion 1302 does not span the entire length of the mobile robot 1310. Most of the mobile robot 1310 has a height of 1306 while the frame portion 1302 has an additional height of 1308. The mobile robot 1310 can navigate around obstacles that are lower than the frame portion 1302 so long as clearance is provided for the frame portion 1302 itself. Accordingly, the safety processor 218 can determine the critical sensor regions 1132, 1134 with reference to the body of the mobile robot 1310.

The safety processor 218 can also determine the critical sensor regions 1132, 1134 with reference to a payload of the mobile robot 1310. As shown in FIG. 13A, the mobile robot 1310 can carry a payload 1304. Payloads of assorted sizes can be attached to portions of the mobile robot 1310 by various means, each having a different dynamic and kinematic effect on the mobile robot 1310. For example, a payload 1304 can be attached to the top of the mobile robot 1310. In other embodiments, a cargo carrying component, such as but not limited to a cart, can be coupled to the mobile robot 1310 to carry a payload 1304. The mobile robot 1310 can tow or push a payload 1304. In some embodiments, the safety processor 218 can monitor the body of the mobile robot 1310 and determine the payload 1304 based on the body.

The mobile robot 1310 carrying the payload 1304 as shown in FIG. 13A provides an overhang of height 1312. The mobile robot 1310 can navigate around small obstacles that are shorter than the overhang so long as clearance is provided for the payload 1304 itself. For example, the mobile robot 1310 can carry the payload 1304 over a person's feet. Accordingly, the safety processor 218 can determine the critical sensor regions 1132, 1134 with respect to the physical shape of the payload 1304 of the mobile robot 1310. In particular, the critical sensor regions 1132, 1134 can be defined at shin height but not include floor height.

Figure 13B:
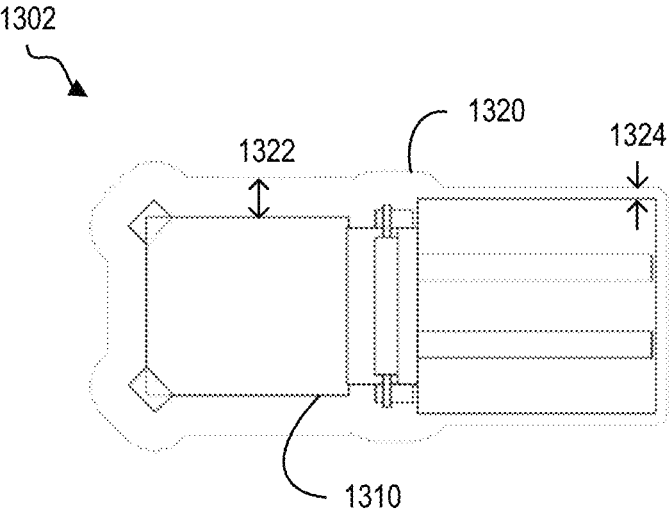
FIG. 13B is a top plan view of the mobile robot of FIG. 13A.

Referring now to FIG. 13B, shown therein is a top plan view 1302 of the mobile robot 1310 of FIG. 13A. As described, the safety processor 218 can determine a robot buffer region 1320 around the mobile robot 1310 based on safety requirements, the physical shape of the mobile robot 1310, the shape of the object or obstacle, or a combination thereof. As shown in FIG. 13B, the robot buffer region 1320 can be non-uniform. For example, the robot buffer region 1320 can have a width of 1322 around the body of the mobile robot 1310 and a smaller width of 1324 around the payload 1304.

In addition to the physical shape of the payload 1304, the weight of the payload 1304 can affect the stopping path of the mobile robot 1310. When the mobile robot 1310 is carrying a heavy payload 1304, the stopping path of the mobile robot 1310 can be larger. The sensing system 220 of mobile robot 1310 can include one or more sensors to generate sensor load data. For example, the sensors can include a weight sensor, a load cell, a force sensor, or a strain gauge.

The safety processor 218 can monitor the weight of the mobile robot 1310 and determine the payload 1304 based on the weight. In some embodiments, the mobile robot 1310 can include a plurality of sensors to detect the location of the payload 1304 or the weight distribution of the mobile robot 1310 with the payload 1304. Based on the location or weight distribution, the safety processor 218 can determine the center of gravity of the mobile robot 1310, which can significantly change the stopping path.

In some embodiments, the safety processor 218 can determine the payload 1304 based on a historical motion of the mobile robot 1310. For example, the safety processor 218 can determine that after stopping at a pick-up station, the mobile robot 1310 will have an expected payload 1304. In some embodiments, the safety processor 218 can determine a payload 1304 based on a detected body, a detected weight, a historical motion, or any combination thereof.

The safety processor 218 can also determine the critical sensor regions 1132, 1134 with reference to an operating mode of the mobile robot. In some embodiments, the mobile robot 1310 can operate in a narrow mode or a docking mode. The mobile robot 1310 can operate in the narrow mode when the mobile robot 1310 is travelling within a narrow zone, such as a tight corridor or a temporary recovery zone. In such cases, the space within which the mobile robot 1310 can travel within is smaller than usual. Accordingly, the safety processor 218 can define critical sensor regions 1132, 1134 for a narrow operating mode that are smaller than the critical sensor regions 1132, 1134 of a normal operating mode.

The mobile robot 1310 can operate in the docking mode when the mobile robot 1310 is travelling within a docking zone. Docking zones are typically human exclusion zones. When the mobile robot 1310 is in a docking zone, the mobile robot 1310 may perform docking procedures, such as docking with a charger or driving into a pick-up or delivery station. In such cases, the mobile robot 1310 may be expected to come close to particular objects (e.g., charger, pick-up or delivery station) despite the docking zone being a human exclusion zone. Accordingly, the safety processor 218 can define critical sensor regions 1132, 1134 that account for the particular objects of a docking zone.

In some embodiments, the safety processor 218 can determine the operating mode of the mobile robot 1310 from the operation of the mobile robot 1310. In other embodiments, the safety processor 218 can monitor one or more environmental characteristics of the mobile robot 1310 and automatically change the operating mode of the mobile robot 1310 based on sensor data. For example, the safety processor 218 can determine whether the mobile robot 1310 has entered or exited a narrow or docking zone based on sensor data. Such sensor data can include but is not limited to imaging data, range-finding data, navigational data, or guiding infrastructure data.

The safety processor 218 can determine the critical sensor regions 1132, 1134 with reference to one or more environmental conditions of the mobile robot 1310. For example, the mobile robot 1310 may be travelling on a surface with little friction. When the mobile robot 1310 is travelling on a surface with little friction, the stopping path of the mobile robot 1310 may be longer than the stopping path of the mobile robot 1310 on a surface with more friction. In another example, the mobile robot 1310 may be travelling along an incline or ramp. When the mobile robot 1310 is travelling downhill on a ramp, the stopping path of the mobile robot 1310 may be longer than the stopping path of the mobile robot 1310 on a level surface or uphill on the ramp.

The temperature of the mobile robot's environment can also affect the stopping path of the mobile robot 1310. For example, when the mobile robot 1310 is in a warmer climate, the brakes of the mobile robot 1310 can be less effective. Accordingly, the safety processor 218 can define longer critical sensor regions 1132, 1134 when a warmer temperature is detected.

Returning now to FIG. 7, at 710, while the mobile robot 110 autonomously navigates along the trajectory, the robot processor 212 and/or the safety processor 218 can adapt the operation of the plurality of sensors 420a, 420b to prioritize capture of sensor data within the one or more critical sensor regions. Each sensor 420a, 420b can be operable to capture the sensor data for an adjustable detection region 424 defined with respect to the sensing system 420 and the mobile robot 110. Adapting the operation of the plurality of sensors can involve adapting the scan rate, the angular resolution, the linear resolution, the spectrum, or other such properties of the sensors.

The safety processor 218 can change the adjustable detection region 424 while the mobile robot 110 is driving. Returning to FIG. 12, the mobile robot 110 may accelerate and the safety processor 218 can change the adjustable detection region 424 from forming the critical sensor regions 1212*a* to forming the critical sensor regions 1212*c* of FIG. 12. As can be seen, critical sensor regions 1212*c* are adjacent to critical sensor region 1212*a*. Adjacent critical sensor regions 1212*a*, 1212*c* can have minor differences.

For example, at higher speeds, critical sensor regions, such as 1212*g*, are larger. When the mobile robot 110 accelerates, the safety processor 218 can increase the adjustable detection region 424 from an initial critical sensor region, such as 1212*c* to a larger, subsequent critical sensor region, such as 1212*d*. However, the larger, subsequent critical sensor region 1212*d* may detect an object that was previously not detected by the smaller, initial critical sensor region 1212*c* if the object is located within the marginal difference between the initial and subsequent critical sensor regions 1212*c* and 1212*d*. As described, the mobile robot 110 can come to a stop if an object is detected within the critical sensor region 1212*d*. This instantaneous change in the critical sensor regions 1212*c*, 1212*d* can result in an instantaneous stop of the mobile robot 110, which can be undesirable.

To prevent such instantaneous stops, in some embodiments, each critical sensor region can include a primary critical sensor region and a secondary critical sensor region adjacent to the primary critical sensor region. The primary critical sensor region can be proximal to the mobile robot 110 while the secondary critical sensor region can be distal to the mobile robot 110.

In some embodiments, it is possible to split the responsibility of monitoring the primary and secondary critical sensor regions between the robot processor 212 and the safety processor 218. For example, the robot processor 212 can adjust the trajectory (e.g., adjust the speed or heading) of the mobile robot 110 when an object is detected in the second critical sensor region. The safety processor 218 can stop the mobile robot 110 when an object is detected in the first critical sensor region.

Figure 14:
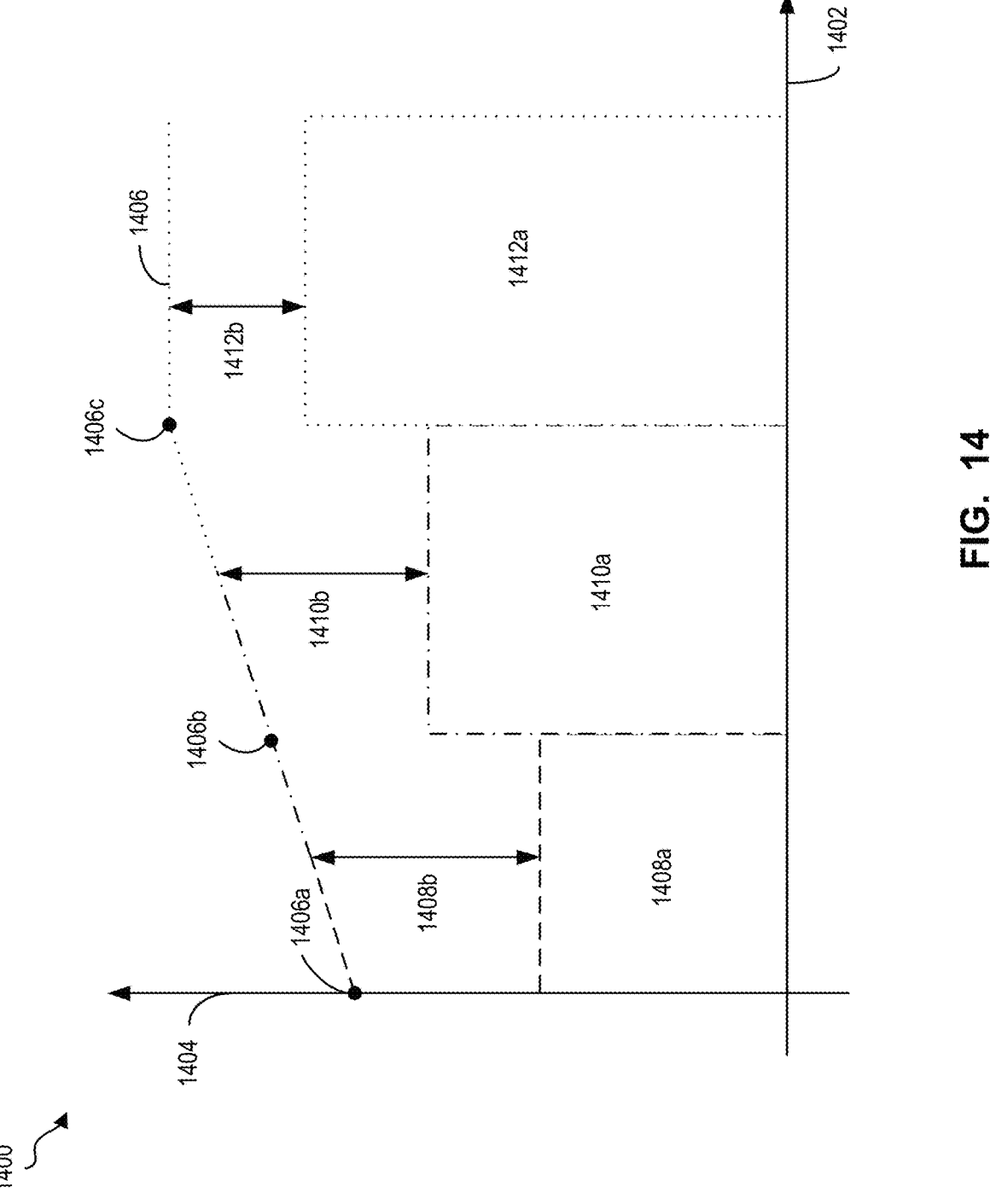
FIG. 14 is a graph illustrating different example critical sensor regions in accordance with an example embodiment.

Referring now to FIG. 14, shown therein is a diagram 1400 of example primary and secondary critical sensor regions for an example sensor. The horizontal axis shows increasing linear velocity 1402. The vertical axis shows increasing size of an overall critical sensor region 1404.

The overall critical sensor region can include a primary critical sensory region and a secondary critical sensor region. In some embodiments, the robot processor 212 can select primary critical sensor regions 1408*a*, 1410*a*, 1412*a* from a plurality of pre-defined critical sensor regions based on the angular velocity and the linear velocity of the mobile robot 110. For example, the primary critical sensor regions 1408*a*, 1410*a*, and 1412*a* can correspond to critical sensor regions of FIG. 13, in which each critical sensor region can be associated with a velocity range.

The robot processor 212 can adjust the secondary critical sensor regions 1408*b*, 1410*b*, 1412*b* based on the angular velocity and the linear velocity of the mobile robot 110. The provision of secondary critical sensor regions 1408*b*, 1410*b*, 1412*b* can ensure that, when driving at the upper end of a velocity range for an initial primary critical sensor region 1408*a*, 1410*b*, 1412*b*, the overall critical sensor region already includes to the subsequent primary critical sensor region. The robot processor 212 can determine the secondary critical sensor regions 1408*b*, 1410*b*, 1412*b* based on an interpolation between the initial and subsequent primary critical sensor regions.

For example, the velocity range for the primary critical sensor region 1408*a* is 1406*a* to 1406*b*. While the mobile robot 110 would move from primary critical sensor region 1408*a* to primary critical sensor region 1410*a* at velocity 1406*b*, the overall critical sensor region will not increase significantly at 1406*b* (i.e., not a step increase). Instead, the secondary critical sensor region 1408*b* can increase proportionally as the mobile robot 110 accelerates from 1406*a* to 1406*b*. Accordingly, the overall critical sensor region also increase proportionally as the mobile robot 110 accelerates to 1406*b* such that the overall critical sensor region already includes the primary critical sensor region 1410*a* before the mobile robot 110 reaches velocity 1406*b* (indicated by the dash-dot lines).

Likewise, the velocity range for the primary critical sensor region 1410*a* is 1406*b* to 1406*c*. The secondary critical sensor region 1410*b* increases proportionally as the mobile robot 110 accelerates from 1406*b* to 1406*c*. As a result, the overall critical sensor region includes the primary critical sensor region 1412*a* at the upper end of the velocity range for primary critical sensor region 1410*a* and before the velocity is 1406*c* (indicated by the dotted lines).

It should be noted that the safety processor 218 can change the adjustable detection region 424 from an initial critical sensor region to a subsequent critical sensor region that is not adjacent to the initial critical sensor region. For example, the mobile robot 110 can enter a narrow zone and the robot processor 212 can change the operating mode of the mobile robot 110 from a normal mode to a narrow operating mode. As a result, the safety processor 218 may also change the adjustable detection region from a critical sensor region for the normal operating mode at a particular angular velocity and a particular linear velocity to a critical sensor region for the narrow operating mode at the same angular velocity and the same linear velocity. The critical sensor region for the narrow operating mode may not be adjacent to the critical sensor region for the normal operating mode. Such non-adjacent critical sensor regions may have more significant differences.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g., ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

The invention claimed is:

1. A method of operating a mobile robot having a processor and a plurality of sensors mounted thereon, the method comprising:
  operating the mobile robot to autonomously navigate along a trajectory; and
  while the mobile robot autonomously navigates along the trajectory, operating the processor to:
    monitor an angular velocity and a linear velocity of the mobile robot during operation;
    while the mobile robot is in operation, continuously determine one or more critical sensor regions defined with reference to the mobile robot based at least on the angular velocity and the linear velocity of the mobile robot, each critical sensor region comprising a primary critical sensor region extending from a body of the mobile robot, and a secondary critical sensor region extending from and adjacent to the primary critical sensor region, wherein the processor comprises a robot processor operable to adjust the trajectory of the mobile robot when an object is detected within the secondary critical sensor region, and a safety processor operable to terminate operation of the mobile robot when the object is detected within the first critical sensor region; and adapt the operation of the plurality of sensors to prioritize capture of sensor data within the one or more critical sensor regions, each sensor being operable to capture the sensor data for an adjustable detection region defined with respect to the sensor and the mobile robot.

2. The method of claim 1, wherein at least one of the adjustable detection regions comprise a sensor range that is variable.

3. The method of claim 2, comprising operating the processor to adapt the operation of one or more sensors of the plurality of sensors to adjust the sensor range of each corresponding adjustable detection region to form a sensor region substantially corresponding to the one or more critical sensor regions.

4. The method of claim 1, wherein the one or more critical sensor regions are defined with reference to the body of the mobile robot.

5. The method of claim 4, wherein the one or more critical sensor regions are defined with reference to a payload of the mobile robot.

6. The method of claim 5, comprising operating the processor to:
  monitor the body of the mobile robot; and
  determine the payload of the mobile robot based on the body of the mobile robot.

7. The method of claim 5, comprising operating the processor to:
  monitor a weight of the mobile robot; and
  determine the payload of the mobile robot based on the weight of the mobile robot.

8. The method of claim 1, wherein the one or more critical sensor regions are defined with reference to an operating mode of the mobile robot.

9. The method of claim 8, comprising operating the processor to:
  monitor environmental characteristics of the mobile robot; and
  change the operating mode of the mobile robot from an initial operating mode to a subsequent operating mode based on the environmental characteristics of the mobile robot.

10. The method of claim 9, comprising operating the processor to determine whether the mobile robot is operating in one or more of a narrow zone or a docking zone.

11. The method of claim 1, comprising operating the processor to monitor environmental conditions of the mobile robot; and wherein the one or more critical sensor regions are defined with reference to the environmental conditions of the mobile robot.

12. The method of claim 1, further comprising operating the processor to automatically adjust the secondary critical sensor region based on the angular velocity and the linear velocity of the mobile robot.

13. The method of claim 12, comprising operating the processor to select a pre-defined primary critical sensor region based on the angular velocity and the linear velocity of the mobile robot.

14. The method of claim 12, comprising operating the processor to:
  adjust the trajectory of the mobile robot when an object is detected in the secondary critical sensor region; and
  stop the mobile robot when an object is detected in the first critical sensor region.

15. A method of operating a mobile robot having a processor and a plurality of sensors mounted thereon, the method comprising, operating the mobile robot to autonomously navigate along a trajectory; and while the mobile robot autonomously navigates along the trajectory, operating the processor to, monitor an angular velocity and a linear velocity of the mobile robot during operation;

while the mobile robot is in operation, continuously determine one or more critical sensor regions defined with reference to the mobile robot based at least on the angular velocity and the linear velocity of the mobile robot, each critical sensor region comprising a primary critical sensor region extending from a body of the mobile robot, and a secondary critical sensor region extending from and adjacent to the primary critical sensor region;

define the secondary critical sensor region based at least on an upper velocity range of the mobile robot and adapt the operation of the plurality of sensors to prioritize capture of sensor data within the one or more critical sensor regions, each sensor being operable to capture the sensor data for an adjustable detection region defined with respect to the sensor and the mobile robot.

16. A system for operating a mobile robot, the system comprising:

a plurality sensors mounted on the mobile robot, each sensor being operable to capture sensor data for an adjustable detection region defined with respect to the sensor and the mobile robot; and a processor operable to:

autonomously navigate the mobile robot along a trajectory; and while the mobile robot autonomously navigates along the trajectory:

monitor an angular velocity and a linear velocity of the mobile robot during operation:

while the mobile robot is in operation, continuously determine one or more critical sensor regions defined with reference to the mobile robot based at least on the angular velocity and the linear velocity of the mobile robot, each critical sensor region comprising a primary critical sensor region extending from a body of the mobile robot, and a secondary critical sensor region extending from and adjacent to the primary critical sensor region, wherein the processor comprises a robot processor operable to adjust the trajectory of the mobile robot when an object is detected within the secondary critical sensor region, and a safety processor operable to terminate operation of the mobile robot when the object is detected within the first critical sensor region; and adapt the operation of the plurality of sensors to prioritize capture of sensor data within the one or more critical sensor regions.

17. The system of claim 16, wherein at least one of the adjustable detection regions comprise a sensor range that is variable.

18. The system of claim 17, wherein the processor is operable to adapt the operation of one or more sensors of the plurality of sensors to adjust the sensor range of each corresponding adjustable detection region to form a sensor region substantially corresponding to the one or more critical sensor regions.

19. The system of claim 16, wherein the second critical sensor region is defined based at least on an upper velocity range of the mobile robot.

20. The system of claim 16, wherein the one or more critical sensor regions are defined with reference to the body of the mobile robot.

21. The system of claim 20, wherein the one or more critical sensor regions are defined with reference to a payload of the mobile robot.

22. The system of claim 21, wherein the processor is operable to:

monitor the body of the mobile robot; and determine the payload of the mobile robot based on the body of the mobile robot.

23. The system of claim 21, wherein the processor is operable to:

monitor a weight of the mobile robot; and determine the payload of the mobile robot based on the weight of the mobile robot.

24. The system of claim 16, wherein the one or more critical sensor regions are defined with reference to an operating mode of the mobile robot.

25. The system of claim 24, wherein the processor is operable to:

monitor environmental characteristics of the mobile robot; and change the operating mode of the mobile robot from an initial operating mode to a subsequent operating mode based on the environmental characteristics of the mobile robot.

26. The system of claim 25, wherein the processor is operable to determine whether the mobile robot is operating in one or more of a narrow zone or a docking zone.

27. The system of claim 16, wherein the processor is operable to monitor environmental conditions of the mobile robot; and the one or more critical sensor regions are defined with reference to the environmental conditions of the mobile robot.

28. The system of claim 16, wherein the processor is operable to automatically adjust the secondary critical sensor region based on the angular velocity and the linear velocity of the mobile robot.

29. The system of claim 28, wherein the processor is operable to select a pre-defined primary critical sensor region based on the angular velocity and the linear velocity of the mobile robot.

30. The system of claim 28, wherein the processor is operable to:

adjust the trajectory of the mobile robot when an object is detected in the secondary critical sensor region; and stop the mobile robot when an object is detected in the first critical sensor region.

* * * * *